US012670502B2

(12) United States Patent
Ashkenazi et al.

(10) Patent No.: US 12,670,502 B2
(45) Date of Patent: Jun. 30, 2026

(54) METHOD FOR QUANTIFICATION OF THE LEVEL OF PERFORMANCE OF A HUMAN ACTIVITY DIRECTED TO MITIGATION OF ANTHROPOGENIC EFFECTS ON THE ENVIRONMENT

(71) Applicant: BIOSPHERA INC., Wilmington, DE (US)

(72) Inventors: Oded Calderon Ashkenazi, Ramat Gan (IL); Harel Calderon Ashkenazi, Punta Pacifica (PA)

(73) Assignee: BIOSPHERA INC., Wilmington, DE (US)

( * ) Notice: Subject to any disclaimer, the term of this patent is extended or adjusted under 35 U.S.C. 154(b) by 0 days.

(21) Appl. No.: 18/716,371

(22) PCT Filed: Dec. 7, 2022

(86) PCT No.: PCT/IL2022/051297
§ 371 (c)(1),
(2) Date: Jun. 4, 2024

(87) PCT Pub. No.: WO2023/105521
PCT Pub. Date: Jun. 15, 2023

(65) Prior Publication Data
US 2025/0037147 A1     Jan. 30, 2025

(30) Foreign Application Priority Data
Dec. 7, 2021     (IL) .......................................... 288772

(51) Int. Cl.
*G06Q 30/018*     (2023.01)
*G06Q 10/0637*     (2023.01)

(52) U.S. Cl.
CPC ....... *G06Q 30/018* (2013.01); *G06Q 10/0637* (2013.01)

(58) Field of Classification Search
CPC .. G06Q 30/018; G06Q 10/0637; G06Q 10/00; G06F 9/44
See application file for complete search history.

(56) References Cited

U.S. PATENT DOCUMENTS

2010/0070404 A1     3/2010   Mcconnell et al.
2011/0192213 A1     8/2011   Zimmerman et al.
(Continued)

FOREIGN PATENT DOCUMENTS

EP     1631871 A2     3/2006

OTHER PUBLICATIONS

Kim et al.,"Assessment of the CO2 emission and cost reduction performance of a low-carbon-emission concrete mix design using an optimal mix design system",2013,ScienceDirect,pp. 729-741 (Year: 2013).*

(Continued)

*Primary Examiner* — Alexander Khong
(74) *Attorney, Agent, or Firm* — The Roy Gross Law Firm, LLC; Roy Gross

(57) ABSTRACT

Determining reducibility over time for greenhouse gases resulting from a set of processes that generate a good or service. The measure is an emission ratio for each time period. A subset of activities generating Reducible emissions and a subset generating Core emissions is identified for the set of processes. For each time period, the emission ratio is generated by: measuring all emissions and determining total Core emissions and total Reducible emissions, and determining an emission ratio from the total Core emissions and the total Reducible emissions. Tracking of the emission ratio over time to provide an effective measure of reducibility for the greenhouse gases for the set of activities.

14 Claims, 11 Drawing Sheets

(56) References Cited

U.S. PATENT DOCUMENTS

| | | | |
|---|---|---|---|
| 2022/0040668 A1* | 2/2022 | Weston | B01D 53/02 |
| 2024/0127264 A1* | 4/2024 | Nguyen | H04L 63/107 |
| 2025/0156850 A1* | 5/2025 | Diaz | G06Q 20/389 |

OTHER PUBLICATIONS

CFN,"Main sources of Emissions—Climate Facts Now",2019,https://climatefactsnow.org/en/main-sources-of-emissions/,pp. 1-14 (Year: 2019).*

Asselstine et al. (2016). Cocoa Liquor, Butter & Powder Production. University of Pennsylvania, Senior Design Reports (CBE), Department of Chemical & Biomolecular Engineering. Available online: [https://core.ac.uk/download/pdf/76393384.pdf].

Bellona Europa (Bellona.org) (2019). Steel and emissions: How can we break the link?. Published Mar. 25, 2019. Available online: [https://bellona.org/news/fossil-fuels/2019-03-is-steel-stealing-our-future].

Liu, C., Cutforth, H., Chai, Q. et al. Farming tactics to reduce the carbon footprint of crop cultivation in semiarid areas. A review. Agron. Sustain. Dev. 36, 69 (2016). https://doi.org/10.1007/s13593-016-0404-8.

EcoTransIT World Initiative (EWI) (2019). EcoTrasnIT World, Ecological Transport Information for Worldwide Transports: Methodology and Transit Data Update 2019, Berne-Hannover-Heidelberg, Sep. 27, 2019. Available online: [https://download.ecotransit.world/EcoTransIT_World_Methodology_Data_Update_2019.pdf]

Wikipedia.org (2024), Energy Recycling. Available online: [https://en.wikipedia.org/wiki/Energy_recycling].

Hillier et al. (2009). The carbon footprints of food crop production, International Journal of Agricultural Sustainability, 7:2, 107-118. https://doi.org/10.3763/ijas.2009.0419.

Huijbregts, M.A.J., Steinmann, Z.J.N., Elshout, P.M.F. et al. ReCiPe2016: a harmonised life cycle impact assessment method at midpoint and endpoint level. Int J Life Cycle Assess 22, 138-147 (2017). https://doi.org/10.1007/s11367-016-1246-y.

Nestlé S.A. (2019), Nestle Cocoa Plan Progress Report 2019. Available online: [https://www.nestle.com/sites/default/files/2020-06/nestle-cocoa-plan-progress-report-2019.pdf].

Rhodes, Russell (2011). Explosive Lessons in Hydrogen Safety. ASK Magazine, Issue 41. ASK Magazine, Appel Knowledge Services, NASA. Available online: [https://appel.nasa.gov/2011/02/02/explosive-lessons-in-hydrogen-safety/].

Alfred Ritter GmbH & Co. KG (2020). Ritter Sport Sustainability Report 2020—Compact Version. Available online: [https://irp.cdn-website.com/6cb74a62/files/uploaded/NHB_2020_kompakt_EN_148x148_einzel.pdf].

Rothoff, Alexander (2018). Evaluating a Power Supply System for a Small-Scale Cocoa Processing Plant: A Multi-Criteria Decision Analysis Approach, [Master's Thesis, Högskolan i Gävle]. Available online: [http://www.diva-portal.se/smash/get/diva2:1183545/FULLTEXT01.pdf].

Sadhukhan J, Dugmore TIJ, Matharu A, Martinez-Hernandez E, Aburto J, Rahman PKSM, Lynch J. Perspectives on "Game Changer" Global Challenges for Sustainable 21st Century: Plant-Based Diet, Unavoidable Food Waste Biorefining, and Circular Economy. Sustainability. 2020; 12(5):1976. https://doi.org/10.3390/su12051976.

Wikipedia.org (2024). Waste heat. Available online: [https://en.wikipedia.org/wiki/Waste_heat].

PCT International Search Report for International Application No. PCT/IL2022/051297, mailed Feb. 9, 2023, 3pp.

PCT Written Opinion for International Application No. PCT/IL2022/051297, mailed Feb. 9, 2023, 4pp.

European Patent Office, Extended European Search Report for European Patent Application No. 22903731.2, dated Oct. 24, 2024, 9pp.

European Patent Office, Communication pursuant to Rules 70(2) and 70a(2) EPC for European Patent Application No. 22903731.2, dated Nov. 12, 2024, 1pp.

* cited by examiner

3030

10

3140

Retrieve all current
Core emissions

3150

Retrieve all current
Reducible emissions

3145

Determine total current
Core emissions from
stored Core emissions

3155

Determine total current
Reducible emissions from
stored Reducible emissions

3160

Calculate current
actual total CO$_2$Re

METHOD FOR QUANTIFICATION OF THE LEVEL OF PERFORMANCE OF A HUMAN ACTIVITY DIRECTED TO MITIGATION OF ANTHROPOGENIC EFFECTS ON THE ENVIRONMENT

CROSS REFERENCE TO RELATED APPLICATIONS

This application is a National Phase of PCT Patent Application No. PCT/IL2022/051297 having International filing date of Dec. 7, 2022, which claims the benefit of priority of Israeli Patent Application No. 288772, filed Dec. 7, 2021, the contents of which are all incorporated herein by reference in their entirety.

FIELD OF THE INVENTION

The present invention generally pertains to a system and method for determining the effects on the environment of paths and actions taken by individuals or organizations, the effects of the paths and actions determined by quantifiable metrics related to the paths and actions taken by the individuals or organizations.

BACKGROUND OF THE INVENTION

The algorithm generates numerical values based on quantifiable metrics for the results of the paths and actions taken by individuals, community organizations, companies and local, regional and national governments. These numerical values are based on the activities, lifestyles and demands of the individuals, community organizations, companies and local, regional and national governments, and are intended to address the environmental degradation caused by the activities, lifestyles and demands, and the consequences of the degradation on society.

Each action involving any economic component has embedded in it an environmental and social cost; each action, as small or large as it may be, is part of an ecological footprint which measures human demand on nature. Hence, to every action can be attributed an environmental cost and, consequently, a social cost. Most of these costs have been, hitherto, unaccounted for.

It is therefore a long felt need to provide a means of accounting for environmental and social costs of the actions.

SUMMARY OF THE INVENTION

It is an object of the present invention to disclose a system for determining the effects on the environment of paths and actions taken by individuals or organizations, the effects of the paths and actions determined by quantifiable metrics related to the paths and actions taken by the individuals or organizations.

It is another object of the present invention to disclose a method for determining a measure of reducibility of greenhouse gases comprising steps of:

identifying a set of activities, said identifying of said set of activities being selected from a group consisting of automatically, semi-automatically or manually;

for said set of activities, identifying a first subset of activities, each member of said first subset generating Reducible emissions, said identifying of said first subset of activities being selected from a group consisting of automatically, semi-automatically or manually;

for said set of activities, identifying a second subset of activities, each member of said second subset generating Core emissions, said identifying of said second subset of activities being selected from a group consisting of automatically, semi-automatically or manually;

providing an emission ratio for a predetermined period of time, comprising steps of:

for each member of said first subset of activities, determining an amount of Reducible emissions, said determining of said amount of Reducible emissions selected from a group consisting of automatically, semi-automatically or manually;

generating total Reducible emissions from said subset of Reducible emissions;

for each member of said second subset of activities, determining an amount of Core emissions, said determining of said amount of Core emissions being selected from a group consisting of automatically, semi-automatically or manually;

generating total Core emissions from said subset of Core emissions;

generating total emissions from said total Core emissions and said total Reducible emissions;

generating said emission ratio from a ratio of two items selected from a group consisting of said total Reducible emissions, said total Core emissions, or said total emissions; and storing said total Core emissions and said total Reducible emissions; and repeating said providing an emission ratio at least once over a different predetermined period of time;

thereby tracking said emission ratio to provide an effective measure of said reducibility of said greenhouse gases for said set of activities.

It is another object of the present invention to disclose the method as described above, additionally comprising a step of selecting said ratio from a group consisting of $CO_2Re$, $C_T$, $C_R$ or $R_T$.

It is another object of the present invention to disclose the method as described above, additionally comprising a step of identifying at least one alternative activity, at least one result of said alternative activity being equivalent to at least one result of at least one member of said set of activities.

It is another object of the present invention to disclose the method as described above, additionally comprising a step of generating a predicted amount of Reducible emissions for said at least one alternative activity.

It is another object of the present invention to disclose the method as described above, additionally comprising a step of generating total predicted Reducible emissions from said predicted Reducible emissions and Reducible emissions for activities in said subset of Reducible emissions where there are no predicted Reducible emissions.

It is another object of the present invention to disclose the method as described above, additionally comprising the following steps:

generating total predicted emissions from said total predicted Reducible emissions and said total Core emissions; and generating a ratio of two items selected from a group consisting of said total predicted Reducible emissions, said total Core emissions or said total predicted emissions.

It is another object of the present invention to disclose the method as described above, additionally comprising a step of selecting said Reducible emissions from a group consisting of $CO_2$ emissions, $CH_4$ emissions, $O_3$ emissions, $N_2O$ emissions, chlorofluorocarbon emissions, hydrofluorocarbon emissions or any combination thereof.

It is another object of the present invention to disclose the method as described above, additionally comprising a step of selecting said Core emissions from a group consisting of $CO_2$ emissions, $CH_4$ emissions, $O_3$ emissions, $N_2O$ emissions, chlorofluorocarbon emissions, hydrofluorocarbon emissions or any combination thereof.

It is another object of the present invention to disclose the method as described above, additionally comprising a step of determining a total amount of emissions from said amount of Reducible emissions and said amount of Core emissions.

It is another object of the present invention to disclose the method as described above, additionally comprising a step of generating a ratio between said amount of total emissions and a member of a group consisting of said amount of Reducible emissions and said predicted amount of Reducible emissions.

It is another object of the present invention to disclose the method as described above, additionally comprising a step of generating a ratio between said amount of Core emissions and said amount of total emissions.

It is another object of the present invention to disclose a system for determining a measure of reducibility of greenhouse gases, comprising:

one or more processors; and a computer-readable storage device coupled to the one or more processors and having instructions stored thereon which, when executed by the one or more processors, cause the one or more processors to perform operations comprising:

identifying a set of activities, said identifying of said set of activities being selected from a group consisting of automatically, semi-automatically or manually;

for said set of activities, identifying a first subset of activities, each member of said first subset generating Reducible emissions, said identifying of said first subset of activities selected from a group consisting of automatically, semi-automatically or manually;

for said set of activities, identifying a second subset of activities, each member of said second subset generating Core emissions, said identifying of said second subset of activities selected from a group consisting of automatically, semi-automatically or manually;

providing an emission ratio for a predetermined period of time, comprising steps of:

for each member of said first subset of activities, determining an amount of Reducible emissions, said determining of said amount of Reducible emissions selected from a group consisting of automatically, semi-automatically or manually;

generating total Reducible emissions from said subset of Reducible emissions;

for each member of said second subset of activities, determining an amount of Core emissions, said determining of said amount of Core emissions selected from a group consisting of automatically, semi-automatically or manually;

generating total Core emissions from said subset of Core emissions;

generating total emissions from said total Core emissions and said total Reducible emissions;

generating said emission ratio from a ratio of two items selected from a group consisting of said total Reducible emissions and said total Core emissions, or said total emissions; and storing said total Core emissions and said total emissions; and repeating said providing an emission ratio at least once, over a different predetermined period of time;

wherein said emission ratio is trackable, said trackability providing an effective measure of said reducibility of said greenhouse gases for said set of activities.

It is another object of the present invention to disclose the system as described above, wherein said ratio is selected from a group consisting of $CO_2Re$, $C_T$, $C_R$ or $R_T$.

It is another object of the present invention to disclose the system as described above, wherein at least one alternative activity is identified as having at least one result of said alternative activity being equivalent to at least one result of at least one member of said set of activities.

It is another object of the present invention to disclose the system as described above, wherein a predicted amount of Reducible emissions is generated for said at least one alternative activity.

It is another object of the present invention to disclose the system as described above, wherein total predicted Reducible emissions are generated from said predicted Reducible emissions and Reducible emissions for activities in said subset of Reducible emissions where there are no predicted Reducible emissions.

It is another object of the present invention to disclose the system as described above, wherein total predicted emissions are generated from said total predicted Reducible emissions and said total Core emissions; and a ratio is generated of two items selected from a group consisting of said total predicted Reducible emissions and said total Core emissions or said total predicted emissions.

It is another object of the present invention to disclose the system as described above, wherein said Reducible emissions are selected from a group consisting of $CO_2$ emissions, $CH_4$ emissions, $O_3$ emissions, $N_2O$ emissions, chlorofluorocarbon emissions, hydrofluorocarbon emissions or any combination thereof.

It is another object of the present invention to disclose the system as described above, wherein said Core emissions are selected from a group consisting of $CO_2$ emissions, $CH_4$ emissions, $O_3$ emissions, $N_2O$ emissions, chlorofluorocarbon emissions, hydrofluorocarbon emissions or any combination thereof.

It is another object of the present invention to disclose the system as described above, wherein a total amount of emissions is determined from said amount of Reducible emissions and said amount of Core emissions.

It is another object of the present invention to disclose the system as described above, wherein a ratio is generated between said amount of total emissions and a member of a group consisting of said amount of Reducible emissions and said predicted amount of Reducible emissions.

It is another object of the present invention to disclose the system as described above, wherein a ratio is generated between said amount of Core emissions and said amount of total emissions.

BRIEF DESCRIPTION OF THE FIGURES

In order to better understand the invention and its implementation in practice, a plurality of embodiments will now be described, by way of non-limiting example only, with reference to the accompanying drawings, wherein.

DETAILED DESCRIPTION OF THE PREFERRED EMBODIMENTS

Figure 1:
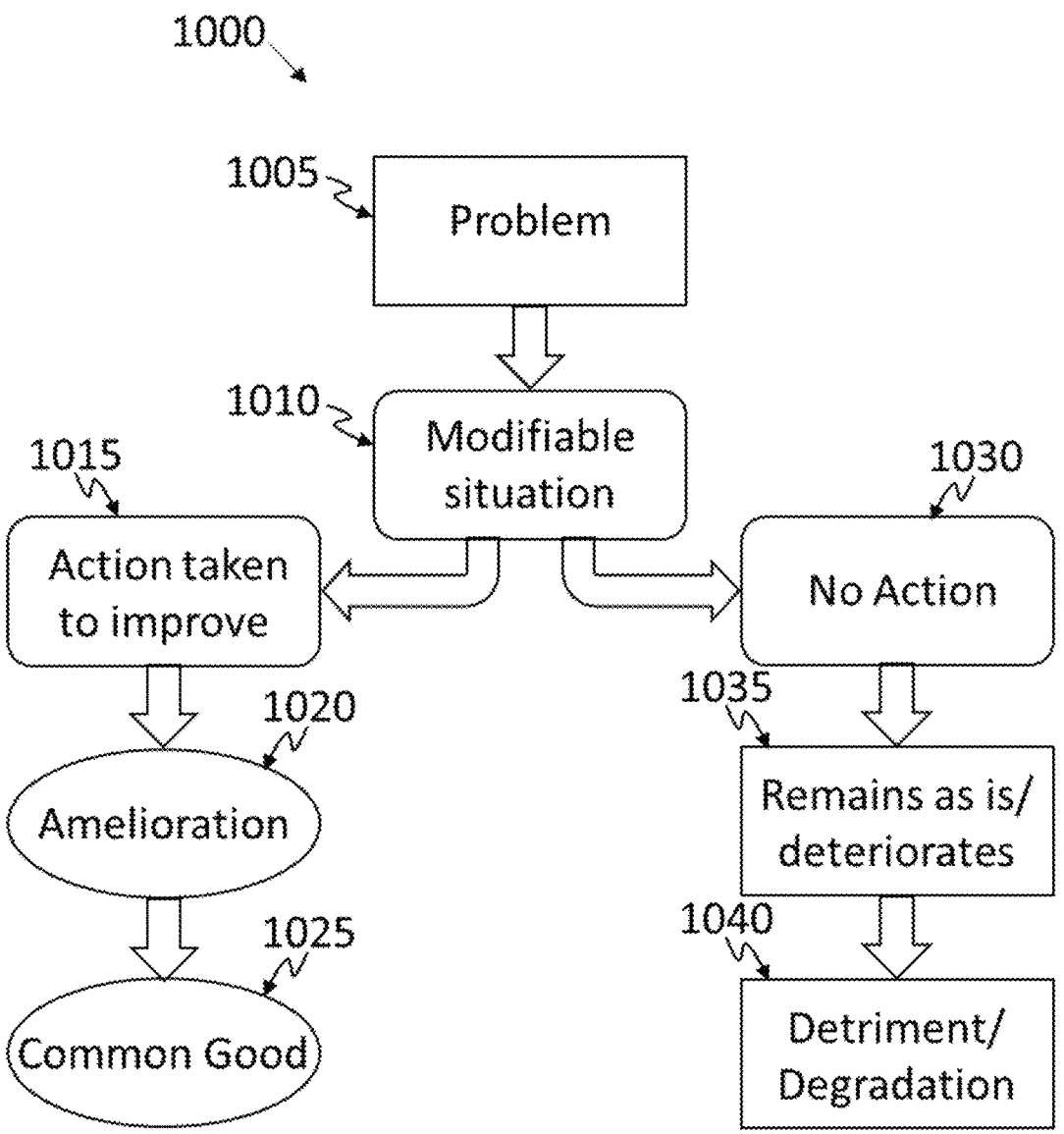
FIG. 1 depicts a flowchart schematically illustrating results of possible responses to a problem.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for determining the effects on the environment of paths and actions taken by individuals or organizations, the effects of the paths and actions determined by quantifiable metrics related to the paths and actions taken by the individuals or organizations The term 'cacao' hereinafter refers to seeds from a small tropical American evergreen tree, the cacao tree.

The term 'cocoa' hereinafter refers to a processed product made using cacao seeds. Non-limiting examples of such a processed product are cocoa, cocoa butter, and chocolate.

The term 'CO2' hereinafter refers to a quantity of $CO_2$ produced during a process.

The term 'CO2e' hereinafter refers to a total quantity of greenhouse gases produced, including the amount of $CO_2$ produced and a $CO_2$-equivalent amount of production of other greenhouse gases.

The term 'CO2Re' hereinafter refers to an emission ratio, a measure of the change in CO2e.

The term 'Core emission' hereinafter refers to a type of emission that can not be changed, either because the type of emission depends on the laws of physics or because of the limitations of current technologies. Non-limiting examples of Core emissions comprise generation of methane during digestion of plant matter by animals (including humans) and generation of oxygen during the generation of hydrogen by electrolysis of water. Four methodologies are currently in common use for calculating and estimating the entirety of a company's carbon footprint, these being: the Greenhouse Gas Protocol (GHG Protocol) developed by the World Resource Institute WRI and the World Business Council on Sustainable Development WBCSD, ISO 14025/14064/ 14067, in three different versions encompassing slightly different scopes, the Publicly Available Specifications-2050 (PAS 2050) developed by the British Standard Institution BSI, and the 2006 IPCC guidelines for National Greenhouse Gas inventories. All four divide sources of emissions into Core and Reducible emissions, although, for some processes, whether a type of emission is termed "Core" or "Reducible" may differ between protocols.

The term 'Reducible emission' hereinafter refers to a type of emission that can be readily changed by improvements in technology, by a change in the process step, or by abatement procedure(s). Four methodologies are currently in common use for calculating and estimating the entirety of a company's carbon footprint, these being: the Greenhouse Gas Protocol (GHG Protocol) developed by the World Resource Institute WRI and the World Business Council on Sustainable Development WBCSD, ISO 14025/14064/14067, in three different versions encompassing slightly different scopes, the Publicly Available Specifications-2050 (PAS 2050) developed by the British Standard Institution BSI, and the 2006 IPCC guidelines for National Greenhouse Gas inventories. All four divide sources of emissions into Core and Reducible emissions, although, for some processes, whether a type of emission is termed "Core" or "Reducible" may differ between protocols.

The term '$CO_2Re$' hereinafter refers to an emission ratio, a measure of the change in CO2e.

The terms 'process step' and 'activity' are used synonymously herein and hereinafter refer to a step in the process of generating a good or service from some combination of initial inputs and the outputs of a previous process step. For non-limiting example, a process step could comprise transferring goods from a factory to a warehouse.

The term 'set of activities' hereinafter refer to a number of activities that have a common characteristic, for example, all activities generating Core emissions or all activities generating Reducible emissions.

In order to further the betterment of society as a whole, the $CO_2Re$ package disclosed herein assigns numerical values to the actions humans undertake. Individual actions are given a value relative to the performance of such actions whose ultimate goal is a common good. Common good, in this case, encompasses all aspects of existence in the planet, the interaction between the physical, chemical and biological components, going beyond human well-being and societal welfare, integrating the natural environment from the micro to the macro, and all which is interrelated in the ecosystems of life, through all spatial and temporal aspects, hence, including all of the biosphere.

FIG. 1 schematically illustrates results (1000) of possible responses to a problem (1005). Most problems lead to an actable situation (1010)—it is possible for something to be done in response to the problem. If action is taken (1015), then the problem can be ameliorated (1020), leading to an improvement (1025) in the common good. If, on the other hand, no action is taken (1030) or a badly-chosen action is taken, then, as a result of the problem, conditions (1035) remain, at best, the same, or, more probably, deteriorate, leading to deterioration (1040) or degradation of the environment.

All stakeholders-individuals, communities, companies and governments—can take actions that can mitigate, reduce or cancel their environmental and social footprint. To begin addressing these issues, a precise and transparent measurement and calculation of the footprint for each good and service is required in order to determine the entirety of the stakeholder's environmental impact.

A Life Cycle Assessment (LCA) (FIG. 2) is a methodology for assessing the environmental impacts associated with the stages of the life-cycle of a product, process or service. It provides an exact assessment of the environmental- and by extension, social-footprint of such product, process or service.

In the case of a manufactured product, for non-limiting example, an LCA (1100) encompasses all activities involved in a cradle-to-grave cycle, from provision of resources (1130) for non-limiting example, by extraction of raw materials or recycling, and processing (1105) and the use of precursors (part of processing), through manufacture (1110), packaging (part of manufacture), distribution (1115) and use (1120), all the way through to the end of life (1125), comprising recycling or disposal of the materials constituting the product. Recycling (1125) can provide resources (1130) which can then be processed (1105) for manufacture (1110) into a new product.

The LCA then is incorporated within the overall Corporate Footprint (CF), for which a separate assessment is carried out involving all aspects of the company's activities not measured in the LCA so as to determine the overall environmental footprint of a company. Thus, a CF must include an LCA or a Product Footprint (PF) of all of the company's products and services within an all-encompassing assessment of its environmental impact.

The completion of a CF analysis provides a precise picture of several areas of environmental impact arising out of the company's activities:

Carbon Footprint

Water Footprint

Ecosystems Quality

Natural Resources

Human Health

Once the Corporate Footprint has been completed, interpretation of the results yields two numerical values. One, the Reducible Footprint, is derived from an itemization of environmental impacts that can be reduced or eliminated throughout the LCA (PF) of each product and the overall CF of the company and the second, the Core Footprint, is derived from an itemization of environmental impacts that are unavoidable or cannot be further reduced.

Reducible (Avoidable) Footprint

The Reducible Footprint comprises any type of impact on the environment derived from actions, processes of production or energy consumption that can be reduced or cancelled by changing at least one action, process, type of energy consumed or method of energy consumption. The change can be made at any stage of a company's PF cycle, CF cycle and any combination thereof.

EXAMPLES a. Reusing Excess Heat in a Factory

Heating accounts for almost half of total global energy use, divided equally between heat for industrial processes and heat for use in buildings. Hence, recovery and reuse of heat can reduce heat generation, thereby reducing the environmental footprint caused by heat generation and also reducing the need for economic investment in, for non-limiting example, fuel.

Sources of waste heat include living organisms, human activities, and natural systems. For non-limiting example, an adult generates between about 100 W and about 430 W, depending on the work being done, incandescent light bulbs get hot, a refrigerator warms the room air, an internal combustion engine generates high temperature exhaust gases, and electronic components get warm when in operation (https://en.wikipedia.org/wiki/Waste_heat).

Waste heat recovery is a process that captures excess heat that would normally be discharged from manufacturing facilities and converts it into electricity and/or steam, or returns energy to the manufacturing process in the form of a heated fluid, such as, but not limited to, air, water, glycol, or oil (https://en.wikipedia.org/wiki/Energy_recycling).

The Corporate Footprint of a manufacturer can be reduced by reusing the excess heat, as described above. As a consequence of the reuse, the baseline amount of electricity, heat or both needed for the manufacturing process is reduced, and hence, the CF is shown to have a Reducible Footprint contained within it.

Figures 2, 3:
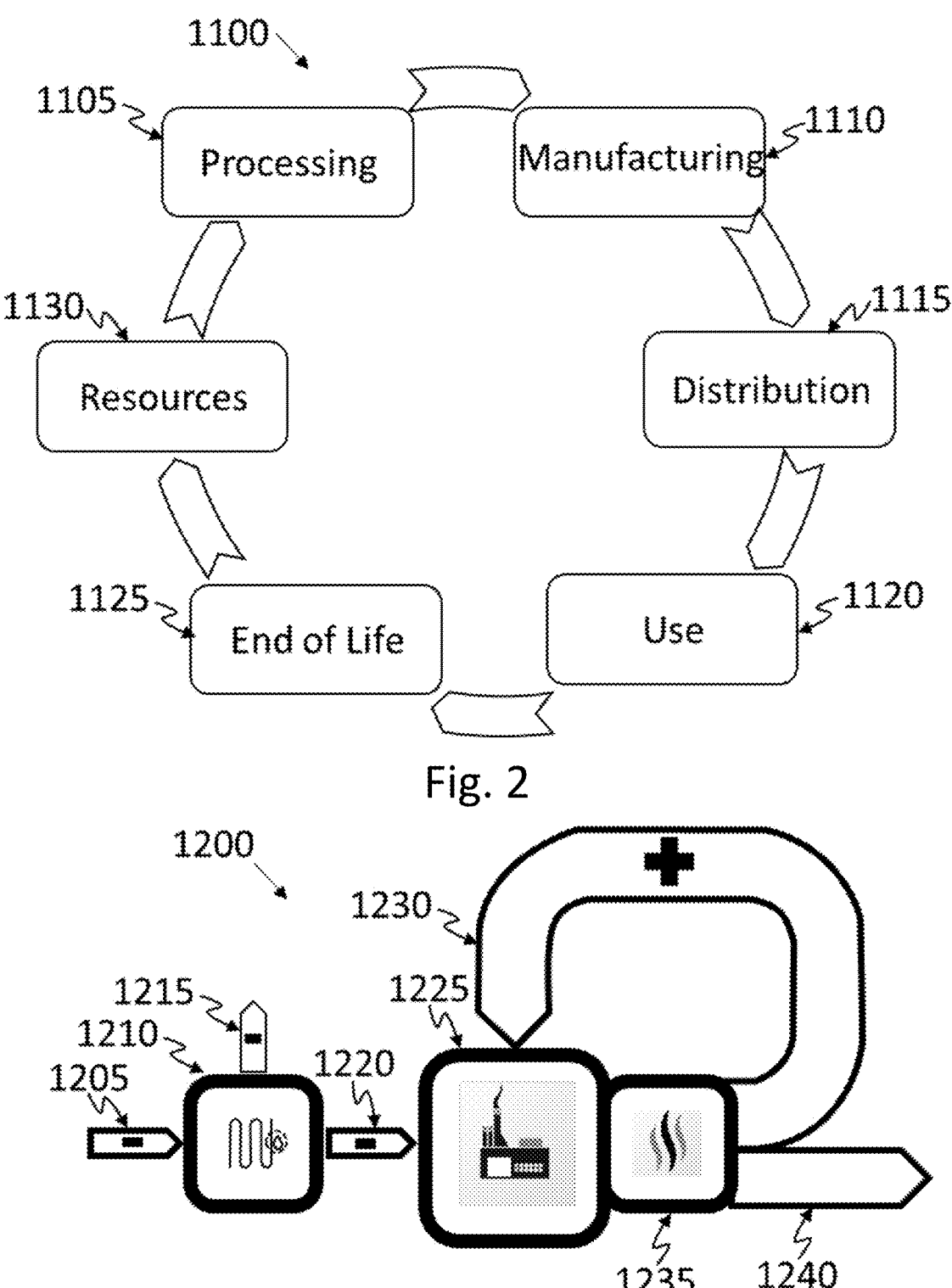
FIG. 2 schematically illustrates a Life Cycle Assessment for assessing the environmental impacts associated with the stages of the life-cycle of a product, process or service.
FIG. 3 shows an illustrative example of reusing excess heat.

FIG. 3 shows an illustrative example of reusing excess heat (1200). A fuel (1205) is input into a process heat boiler (1210). The output of the process heat boiler (1210) is greenhouse gases (1215), which add to the CF, and process heat (1220) for use in an industrial process (1225). Usable excess heat (1235) is recycled (1230); some of the excess heat (1240) can not be recycled (unavoidable excess heat) and adds to the CF.

b. Excess Heat for Reuse in Residential Heating, Cooling and Hot Water

A more complex cycle is that of Residential Heating using Industrial Excess Heat (IEH, also referred to as residual heat, surplus heat or waste heat) discharged from an industrial process for delivery to district heating (DH) networks. In this case, residential neighborhoods are provided with heat for space heating, cooling and domestic hot water for family homes through the reuse of excess heat discharged from industrial plants and channeled through a network of pipes into residential areas. Consequently, the industrial plant, through the use of its IEH, is able to lower its environmental footprint in an indirect manner by providing residential users, via DH, heat that would have otherwise been discharged as waste heat allowing for a significant reduction in new production of heat from other sources for these same residential units.

Figure 4:
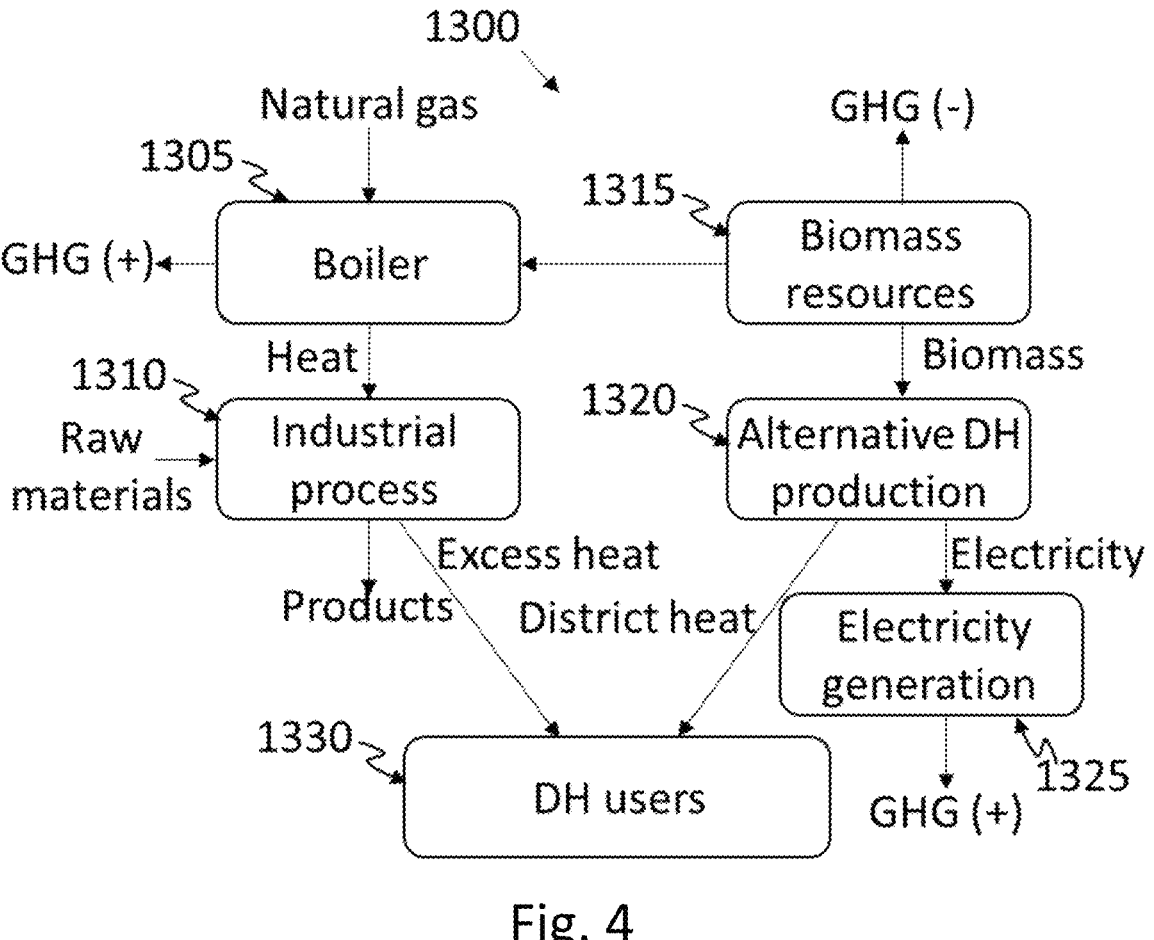
FIG. 4 shows an illustrative example of re-use of industrial excess heat.

FIG. 4 shows an illustrative example of IEH (1300). A fuel is input into a process heat boiler (1305). The output of the process heat boiler (1305) is greenhouse gases, which add to the CF, and process heat (1220) for use in an industrial process (1310). The other input to the industrial process (1310) is raw (or reprocessed) materials. The outputs of the industrial process (1310) are products and excess heat, which is provided to the district heat users (1330). In this example, the cycle also comprises use of biomass resources (1315), generation of which reduces greenhouse gases (GHG (−)). The biomass from the biomass resources (1315) is input to an alternative generator for the district, (1320), which has two outputs, district heat, which is provided to the district heat users (1330), and electricity, which can be provided to the district, or used elsewhere.

c. Food Waste Recycling into by-Products

An example of a reducible environmental footprint in another area is that of Avoidable Food Waste. Two issues arise from current global food waste: On the one hand, food supplies are not distributed efficiently according to where the need for food occurs but rather according to market conditions, whereby areas in the developed world have food surpluses whereas areas in developing countries have food shortages. This creates a situation where there is famine and malnutrition in some areas of the world while food is being discharged from the value chain as waste in other areas of the world.

Global population is expected to increase 40% by 2050 reaching approximately 10 billion, yet today, around 1 billion are severely malnourished and more than 1.2 billion still have no access to clean drinking water. Ironically, 1.3 billion tonnes of food are wasted every year corresponding to a carbon footprint of 3.3 billion tonnes of $CO_2$ equivalents and 250 km$^3$ in lost water.

Food waste represents a global economic loss of $750 billion (excluding fish and seafood). With an increasing population, global food production will have to increase by at least 60% whilst natural resources will become even scarce, unless mitigation strategies are adopted now (https://www.mdpi.com/2071-1050/12/5/1976/htm, MDPI, 5 Mar. 2020, Basel, Switzerland).

On the other hand, the disparate global distribution of food stocks creates an unnecessary surplus in GHG emissions, and particularly an enormous amount of $CO_2$ emissions from the excessive production of food, resulting from an uneven supply chain and an unfair and wrongly distributed food supply in developing countries.

Paradoxically, it is estimated that 18% of anthropogenic $CO_2$ emissions come from the burning of biomass in the agricultural fields in developing countries-which are the main suppliers of food for the global market.

There are very important benefits to reducing the different modes in which food waste imprints its social footprint health-wise as well as its environmental footprint. Recycling food waste has been shown to yield much promise and progress is being made through different paths towards recycling what was thought to be unrecoverable food waste.

d. Plant-Based Protein Isolation

Extraction of plant-based proteins is a proven way to address the necessity for a healthy and sustainable global food supply going forward. Chemically isolating certain amino acids from biomass generated through unavoidable food waste is an innovative process to recycle and produce an efficient and highly concentrated vessel of proteins. This process is done through the extraction of amino acids. Minerals are separated, along with other nutrients, sugars and salts. Ultimately, proteins are isolated from food waste that would have otherwise been disposed of as unrecoverable waste. Consequently, essential amino acids such as Histidine, Isoleucine, Leucine, Phenylalanine, Threonine, Tryptophan and Valine, as well as limited amounts of Methionine and Lysine can be recovered. Such a concentrated form of plant-based proteins is extremely well suited for global distribution in places of hitherto animal-based protein production centers for export. Highly regulated food with targeted functions to enhance wellbeing and physiological responses to reduce risks of disease, in addition to fulfilling energy and nutritional needs, can offer many benefits including the United Nations Sustainable Development Goals (SDGs), in particular, SDG1: No Poverty and SDG2: Zero Hunger. Moreover, their health-wise benefits over animal-based proteins are also an attractive incentive for food substitution in the wealthier global centers of animal-based protein import and consumption. Among the most important benefits of a vegan-based diet are the Sustainability benefits that then reflect themselves in a path towards a Common Good, are the following:

Avoiding Land Use Change by not converting land for livestock production;

Reclamation of land for expanding forests to increase their capacity to pull $CO_2$ from the atmosphere;

Increased biodiversity;

Human health improvement, both physical and mental;

Ecosystem restoration;

Resolution of Social inequality; and

Cost saving due to improved health and environment.

e. Emissions from Smokestacks

Putting one or more filters or scrubbers on a smokestack can significantly reduce the amount of particulates emitted from the smokestack. In one case, in the first year after installation of the smokestack filters, the particulates recovered from the filters were worth enough to pay for installing the filters.

Scrubbers or traps can also be used to remove greenhouse gases; gas traps are readily available for $CO_2$. For other greenhouse gases, technological upgrades, fuel switching or the use of abatement equipment can reduce industry emissions in general.

Core (Unavoidable) Footprint

A Core Footprint is any type of impact on the environment derived from actions, processes of production used or energy consumption, which, during the every-day human activities of production and consumption, cannot be reduced and are, hence, unavoidable, if the final product and/or service is to retain certain minimally required characteristics.

These unavoidable footprints would include environmental impacts that cannot be further reduced through changes implemented at any point of a product's or a process' life cycle, due mainly to current technological limitations.

a. Steel Manufacturing

The global iron and steel industry accounts for approximately 5% of total global $CO_2$ emissions. On average, 1.9 tonnes of $CO_2$ are emitted for every tonne of steel produced. About 2.8MtCO_2 per year are solely related to energy use in the iron and steel sector, about 8% of total energy-related emissions. Over 1.3 billion tons of steel are manufactured and used every year (*Bellona Europa, Steel and emissions: How can we break the link?*, Mar. 25, 2019, https://bellona.org/news/ccs/2019-03-is-steel-stealing-our-future).

The traditional method for making iron and its tougher alloy, steel, which consists of smelting raw materials at extremely high temperatures, has not fundamentally changed since use became widespread more than 150 years ago. Large blast furnaces rely on coke, a carbon-rich fuel made from coal, to reduce iron ore into liquid metal, which is refined into steel. Despite substantial efficiency improvements over the years, the laws of chemistry mean that carbon dioxide is an unavoidable output of this reaction.

There are two ways of reducing the carbon footprint in steel-making. One is to avoid altogether $CO_2$ in steel production by either using scrap in the blast furnaces for the reduction process of iron ore, or to find a reducing agent other than Carbon for this purpose. Another option is to use what are called "end-of-pipe" technologies, which consist of either storage or use of the $CO_2$ emissions.

An alternative to blast furnaces is electric arc furnaces (EAFs) that melt down scrap, instead of using raw materials. EAFs have two obstacles that imperil their scalability. Since scrap is used in electric arc furnaces, less $CO_2$ is emitted than in blast furnaces. EAFs are smaller, less expensive and, because they do not consume coke, pump out less $CO_2$ than blast furnaces. They already account for about one-quarter of global steel output. However, currently, renewable energy sources cannot meet their enormous electricity demands, enough to power a town of 100,000 people. A second limitation is the supply of scrap. Yet a third is that the grades of steel produced in EAFs are often not of the right quality for certain applications, like automotive (*Financial Times, Cleaning up steel is key to tackling climate change*, Jan. 1, 2019, https://www.ft.com/content/3bcbcb60-037f-11e9-99df-6183d3002ee1).

While the second option of storage or reuse would seem a more feasible as a way to reduce $CO_2$ emissions in steel production, current technologies still suffer from scalability issues.

$CO_2$ emissions in the production of steel from iron ore in blast furnaces can be reduced by eliminating coking, the use of coal coke as a reducing agent. In a blast furnace, typically, the iron ore is converted to iron by reacting the blast air with the coke to produce carbon monoxide. The CO, in turn, reacts with the iron oxide to produce carbon dioxide and metallic iron.

However, attempts are being made by several steel producers to eliminate the use of Carbon altogether from the reduction process, instead substituting Hydrogen, which would virtually eliminate $CO_2$ emissions from steel-making. The main obstacles to the scaling of this newer technology is an economic one. Clean hydrogen production is expensive and would require a huge expansion of renewable energy generation capacity. Furthermore, Hydrogen is explosive; a hydrogen/air mixture containing between 4% and 74% hydrogen will explode. It requires only 0.02 mJ of energy to ignite a hydrogen-air mixture, which is less than 7 percent of the energy needed to ignite natural gas (https://www.nasa.gov/pdf/513855main_ASK_41s_explosive.pdf).

Hence, under current technological and economic limitations, $CO_2$ emissions are an unavoidable output in this industrial process, and steel production has a large unavoidable Carbon Footprint.

b. Methane Emissions from Dairy Production

Methane emissions from cows' rumens is a major source of global GHG emissions. According to the Global Carbon Project, climate models suggest that increases in methane levels could see global temperature increasing by 3-4 degrees Celsius by 2100. Methane is 28 times more effective than carbon dioxide at trapping heat and human activity accounts for more than half of methane emissions. Annual emissions of the greenhouse gas have risen by 9% since 2000, which has the same effect on warming as adding 350 million cars to our roads. Research shows that cattle ranching is the main reason for increased methane levels. Emissions from cattle and other ruminants are almost as large as those from the fossil fuel industry for methane.

Given the current methods of raising cattle, and dairy products being sourced from ruminants in general for the production of dairy products, the methane emissions are considered unavoidable GHG emissions.

However, there are two methods that seem to offer a substantial reduction of these emissions: methane capture and methane emission reduction. There are several trials currently being held to measure the efficacy of methane capture from cows at dairy production plants. It basically consists in fitting the cows with props-storage packs and transport pipes—that capture the burps and farts of these ruminants. Instead of allowing these emissions to be delivered into and become part of the increasing levels of methane in our atmosphere, this method allows for the capture, storage and even further reuse of methane as a bioenergy source, whereby the capacity of one cow's methane emissions of approximately 300 l during a 24 hour period is equivalent to running a car or a refrigerator for one day. Once again, the issues of scalability and economic viability make this reduction alternative currently unviable.

A second option is to reduce the amount of methane emitted by a cow. A specific type of bacterium—archaea—found in the first digestive section, the rumen, of the cow, is thought to be the cause of the excessive burping and to a lesser extent, farting of ruminants, such as cows and sheep. Trials are currently underway whereby the archaea found in the rumen are targeted with either a vaccine that boosts anti-archaea antibodies and attacks specifically such bacteria, or providing cows with doses of probiotics to inhibit the production of archaea. However, the changes in the animal's gut biotic composition also affects the animal's wellbeing and milk production. Other methods of methane reduction include breeding towards varieties of cows and sheep that produce about 20% less methane, but all the options currently being tested to reduce or capture methane emissions from ruminants suffer from obstacles such as scalability, economic viability or unknown effects on the animals and/or the quality and quantity of the milk produced.

c. Emission of Gasous Components During Coating of Metals

Metals are coated for many reasons—to prevent corrosion of the metal by materials with which it comes into contact, to protect the metal against wear, to prevent leaching of the metal into material it comes into contact with (e.g., contents of cans). The coating is typically applied as a precursor or monomer and is then cured. For many coatings, the curing process comprises emission of gasous components (e.g., solvents). Reducing the emission of the gaseous components can require (1) changing the method of curing, (2) changing the type of coating, or (3) changing the base material (e.g., replacing the metal with another metal or alloy, replacing the metal with a plastic). In many cases, replacing the metal with another metal or a plastic is not feasible. For example, non-metal cans for beer or soda are not feasible without significant improvement in plastics. Changing the method of curing can be unfeasible because the coating material does not cure in any other way. Changing the type of coating may also be unfeasible because, without significant technological changes, no other coating material has the properties of strength, resistance to corrosion and adhesiveness that are needed.

d. Emission of Gaseous Byproducts During Production of Plastics

For example, during the typical production process for polyester, methanol is emitted. In a different process, PET is produced from pure terephthalic acid, with emission of water. However, the production of polyester from terephthalic acid requires very pure terephthalic acid; methods for producing pure enough terephthalic acid are still being developed e. Melting Plastics for Asthma Inhalers Plastic parts for medical devices are typically made by moulding, so the plastic parts must be melted. A typical plastic for this purpose is polypropylene. One the polypropylene has been brought to its melting temperature (210° C.-290° C.), turning it from a solid into a liquid requires about 71 kJ of energy per kg of polypropylene (latent heat of melting). The total minimum amount of energy used in melting the plastic parts can be reduced by (1) finding a cure for asthma, (2) replacing the polypropylene with a material with a smaller latent heat of melting, or (3) reducing the size of at least some of the polypropylene parts. All of these would require significant technological changes.

In summary, a life cycle assessment of a product or service is necessary in order to determine the environmental loads and the resources consumed in each step of a product or service supply chain, all the way to the product's disposal, reuse or recycling. The assessment will determine the PF (Product Footprint) which, along with the CF (Corporate Footprint), determines the environmental footprint of a company. Once the Life Cycle Assessment (LCA) is complete, a determination can be made of the paths and actions that can be taken to reduce the Environmental Footprint of a company, a product or service. Embedded within the environmental footprint are two types of emissions: Reducible (Avoidable) emissions and Core (Unavoidable) emissions. Reduction of GHG emissions can only be done by addressing Reducible emissions. Core GHG emissions are unavoidable insofar as the current technologies do not allow for a reduction of emissions without significantly altering certain intrinsic and fundamental characteristics of the good or service. Hence, Core emissions must be understood to be a given moment, dependent of the available technologies, and the possibility of implementing these technologies given the issues of scalability, economic factors and the qualitative influence on the resources and the environment.

CO₂Re Algorithm Pertaining to Specific Activities-GHG Emissions, Life Cycle Cost Analysis (LCCA), Sequestration, Storage, Reductions, Offsetting, Rebalancing The seven main GHG gases are water vapor, $CO_2$, methane ($CH_4$), ozone ($O_3$), nitrous oxide ($N_2O$), chlorofluorocarbons and hydrofluorocarbons. Herein, the focus will be on $CO_2$. However, it is used as an example for all gases by using the notation CO2e, with the "e" standing for $CO_2$-equivalent quantities of the other greenhouse gases.

A cradle-to-grave assessment of the environmental impact of goods and services focused on the carbon cycle can provide carbon footprint values.

An initial, detailed, transparent and verifiable carbon footprint calculation of the entire carbon cycle of a company determines the baseline values at a given moment of a company's environmental impact. The CO₂Re package of the present invention collects or is given such baseline values and thereafter uses them to quantitatively compare against and determine the progress achieved by the company.

Methodologies for Estimating a Carbon Footprints

The CO₂Re package's CO₂Re formula can be used to assess the composition of the carbon footprint at any given point in time in order to calculate the values of any reductions/improvements in the emissions born out of activities of entities such as, but not limited to, the lifestyles of individuals or groups of individuals, the activities of companies and manufacturing or bartering groups, geographic areas defined by governing bodies such as local, state, and national governments as well as through biomorphologically determined boundaries such as biomes.

Herein, the exemplary entity will be a company; a company's total carbon footprint will be used as an exemplary embodiment to illustrate the advantages of the use of the algorithm of the present invention.

There are four methodologies in common use for calculating and estimating the entirety of a company's carbon footprint, these being: the Greenhouse Gas Protocol (GHG Protocol) developed by the World Resource Institute WRI and the World Business Council on Sustainable Development WBCSD, ISO 14025/14064/14067, in three different versions encompassing slightly different scopes, the Publicly Available Specifications-2050 (PAS 2050) developed by the British Standard Institution BSI, and the 2006 IPCC guidelines for National Greenhouse Gas inventories.

Any of the methodologies for assessing a company's Product and Corporate Carbon Footprints can be used to calculate their CO₂Re values.

For the purposes of illustrating how the present invention works, the GHG Protocol will be used, as it is currently the calculation methodology most widely used by companies and governments and is, moreover, aligned with the 2006 IPCC methodology for their estimations.

Total $CO_2$ emissions throughout a product or service's cycle determined by the Carbon footprint from sourcing/extraction of raw materials, including the manufacturing of precursors, all the way up until the Point of Sale and further use, recycling and disposal stages are categorized into two types of emissions sources, which nonetheless may overlap according to the methodology of Carbon footprint calculation used, each with its own footprint calculation: the Product Carbon Footprint (PCF) and the Corporate Carbon Footprint (CCF).

PCF and CCF

As shown in Table I, PCF encompasses the emissions generated by a product or service, from the initial phase of extraction of raw materials until the final phase of recycling or disposal (GHG Protocol Scope 1 and 2, and overlaps with Scope 3 items according to each case).

CCF is determined by an assessment of the entirety of emissions of a company which includes the Product Carbon Footprint PCF for all its products and services and any additional GHG Scope 3 indirect emissions that have not been included in the PCF values. So the totality of the life cycle emissions of a company's products and services, combined with additional Scope 3 categories, approximates the CCF.

Of utmost importance, each of the above two types of carbon footprint is composed of a subset of emissions types, which translate into measurement units: Core emissions and Reducible emissions. It is these two subsets of values which gives a precise understanding of the composition of a product's or service's carbon footprint; at the PCF and CCF levels, how the carbon footprint affects the environmental context throughout its life-cycle and drives climate change; and, crucially, what needs to be done to address these embedded environmental and social costs in order to rebalance their accounting and attempt to reverse the damage that has been already done to the biosphere.

TABLE I

| | Upstream Activities | | Reporting Company | Downstream Activities |
|---|---|---|---|---|
| Scope 3 - Indirect | Scope 2 - Indirect | | Scope 1 - Direct | Scope 3 - Indirect |
| Purchased goods and service | | | Company facilities | Transportation and distribution |
| Capital goods | | | Company vehicles | Processing of sold products |
| Fuel and energy related activities | Purchased electricity, steam, heating & cooling for own use | | | Use of sold products |
| Transportation and distribution | | | | End of life treatment of sold products |
| Waste generated in applications | | | | Leased assets |

TABLE I-continued

| | Upstream Activities | | Reporting Company | Downstream Activities |
|---|---|---|---|---|
| Scope 3 - Indirect | Scope 2 - Indirect | | Scope 1 - Direct | Scope 3 - Indirect |
| Business travel Employee commuting Leased assets | | | | Franchise Investments |

Reducible Emissions and Core Emissions

Reducible emissions are the emissions that can be reduced or avoided through implementation of changes in some portion of at least one product's Life-Cycle Assessment, thereby changing a Corporate Carbon Footprint and transitioning to more sustainable practices and green technologies.

Reducible emissions are those where alternative technologies, alternative methods or both exist for accomplishing a portion of a product's life cycle. For most parts of product life cycles, large tables exist of alternative technologies and alternative methods of accomplishing given parts of the product life cycle (e.g., tables for energy supply alternatives, tables for energy use during stages of growing an agricultural product, tables for energy use during mining of a raw material, tables of energy expended by different shipping methods, tables of energy costs of different packaging regimes, tables of energy use by manufacturing machinery, etc.) In practice, one must read through the tables in order to find those alternative methods that are feasible for the given part of the life cycle and, of those that are feasible, which ones are likely to provide the most effective means of reducing CO2e for that product. Core CO2e emissions are those emissions which cannot be further reduced/avoided through the implementation of changes and green technologies throughout the entire Corporate Carbon Cycle (GHG Protocol Scope 1, 2, and 3). Core emissions are the unavoidable, non-reducible, emissions and remain even if all Reducible emissions have been accounted for and all methods of reducing emissions have been effectively implemented.

Core CO2e emissions are those where neither alternative technologies nor alternative methods exist for accomplishing a portion of a product's life cycle. Some portions of the life cycle necessarily remain Core emitters because of the limitations of the laws of physics. Other portions are Core emitters at present but may become Reducible emitters due to new discoveries or changes in technologies. A trivial example is the replacement of open fires with furnaces for heating homes. A single furnace could heat an entire home, instead of needing one fireplace per room for warmth and, more importantly, furnaces are more efficient at generating heat from fuel than open fires. An open fire is often less than 20% energy efficient and, in addition, the chimney evacuates warm air from the living space. The home furnaces that replaced open fires had efficiencies in the range of 56% to 70%, while the best modern conventional heating systems can have efficiencies between 90% and 98%.

CO$_2$Re

The CO$_2$Re Value of a Product/Service/Organization is a formula/algorithm from which a numerical value is derived by quantifying performance metrics. The numerical value, which can change over time, can indicate the reduction in Carbon Footprint. Moreover, the numerical value reflects the proportion of reduction potential out of the total Carbon Footprint at any given moment. It does so by calculating the number of times Reducible CO2e emissions are contained within the Core amount of CO2e emissions. When determined over time, it provides a true measure of a company's actions at reducing their CO2e emissions, their performance at transitioning to greener technologies and a yardstick at measuring their achievements of objectives and targets. The numerical value can be determined as a ratio of the total Reducible to the total Core, or as the ratio of the total Reducible to the Total emissions.

Unlike previous measures of carbon footprint, the CO$_2$Re Value as described herein both gives a measure of the change in carbon footprint over time, thereby allowing the user to monitor the effects of actions, and, more importantly, clearly distinguishes between Core emissions, which are either entirely unavoidable or are unavoidable without technological changes, and Reducible emissions, which can be mitigated or removed by changing one or more activities in the generation of the product or service.

In the prior art, the total emissions of a product or service are given. However, such a number does not provide any clue as to whether the product or service has undergone any changes in its emissions since a previous check or whether any elements of its life cycle can be further transformed in order to continue reducing its Carbon footprint. By presenting a CO$_2$Re number as described herein, it is immediately determinable whether the CO2e emissions of the product or service can be further reduced.

As a trivial, non-limiting example, the carbon cost of making ice cream depends on several factors, including the carbon cost of running the factory itself, the carbon cost of creating the ice cream, the carbon costs of transporting the ingredients, especially the milk and cream, to the factory, the carbon costs of storing the finished product and the carbon cost of transporting the finished product to the places where it will be sold.

Without technological changes, the carbon costs of running the factory, creating the ice cream and storing it are fairly well fixed—these are predominantly Core emissions.

If the ice cream is sold in a number of regions, then the transport costs between the dairies and a production point and between a production point and selling point could be reduced by having several factories, one for each region, and using local sourcing for the milk and cream for each factory. This would significantly reduce the amount of transport needed for the ice cream, thereby reducing the Reducible emissions and the company's overall carbon footprint. Placing ice cream factories close to the dairies producing the milk might further reduce the company's carbon footprint.

The Reducible and Core values can be estimated in terms of fractions/percentages of the Total emissions. Therefore, a company that has been determined to have a CCF number representing the totality of its emissions, has a Reducible Y-number and a Core X-number, then the Y and X will be numerically represented as a fraction or a percentage of the Total emissions. The importance of The CO$_2$Re package's CO$_2$Re formula is the emphasis on the proportionality between Core, Reducible and Total CO2e. This methodology provides a performance-based measurement over time. All other methodologies simply state the CO2e footprint or the CO2e emissions but do not compare them to previous measurements for the same item, product or service. Secondly, and perhaps more importantly, this methodology itemizes the Avoidable (Reducible) and Unavoidable (Core) emissions separately. In the prior art, it is standard practice to state the total emissions for an item, product or service. However, such a number does not provide any clue as to whether the emissions caused by production of the item, product or service have undergone any changes or whether any elements of its life cycle can be further transformed in order to continue reducing its CO2e footprint. By presenting a $CO_2Re$ number, one can immediately determine whether the product, service or item lends itself to any further CO2e emissions reductions. This determination has many crucial implications, including empowering a consumer, stockholder or other stakeholder to demand more action from a manufacturer or seller of the product, item or service.

CCF (Corporate Carbon Footprint)

As explained above, once the PCF has been determined for all the products and services of a company, and all the Scope 3 emissions have been added that were not included in the PCF calculations, the sum of these is the TOTAL CCF of a company. The total CCF is also called the total emissions of a company, the total emissions of a manufacturer or the Corporate Total Emissions (CTE).

Therefore, $$CTE = \text{Totality of } PCFs + \text{Additional Scope 3 (unaccounted for in } PCF)$$

As PCF and Scope 3 are made up of Core and Reducible emissions, the CTE becomes $$CTE = \{PCF \text{ (Core)} + PCF \text{ (Reducible)}\} + \{\text{Scope 3 (Core)} + \text{Scope 3}$$
$$\text{Reducible)}\} = \{PCF \text{ (Core)} + \text{Scope 3 (Core)}\} + PCF \text{ (Reducible)} +$$
$$\text{Scope 3 (Reducible)}\}$$

The ratio of Reducible emissions to Core emissions can give a ratio to track changes over time for products or services.

Figure 5A:
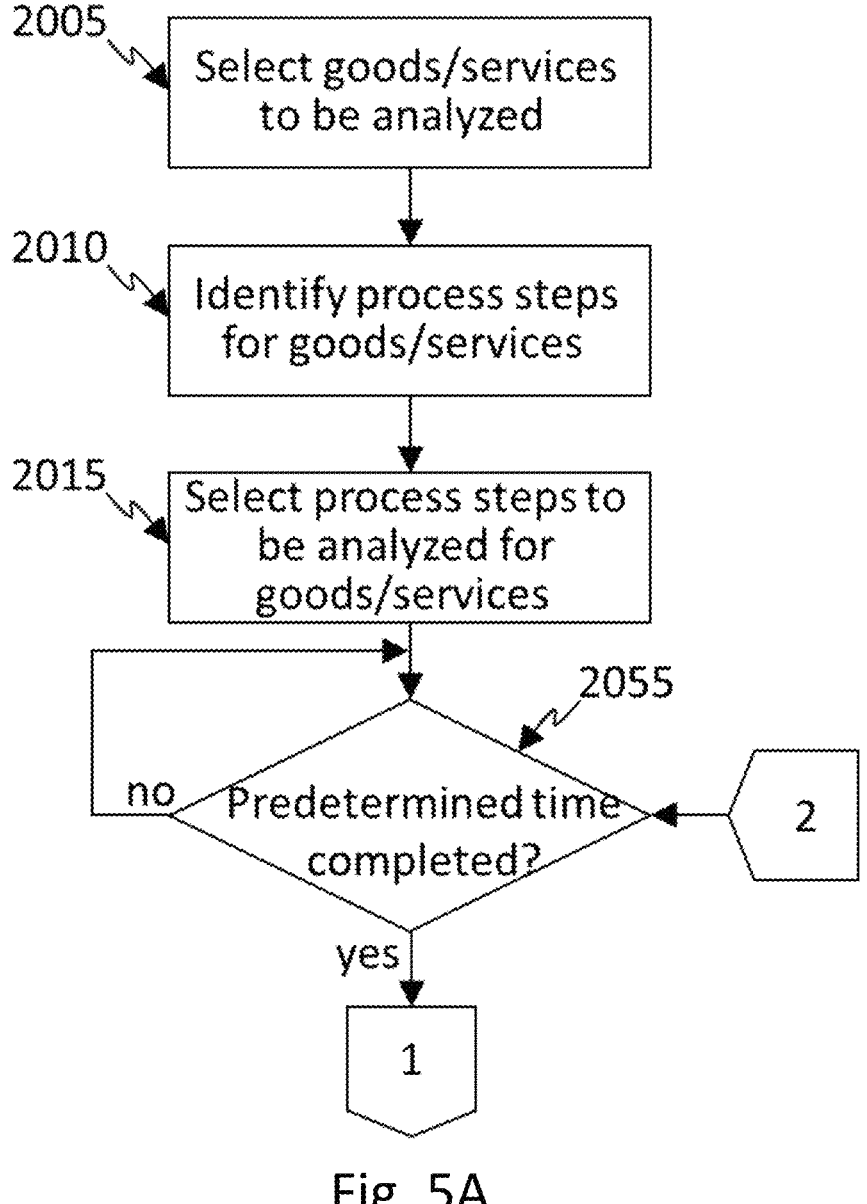
FIG. 5A-B shows an illustrative example of an embodiment of a block diagram of software to generate CO2Re values.
Figure 5B:
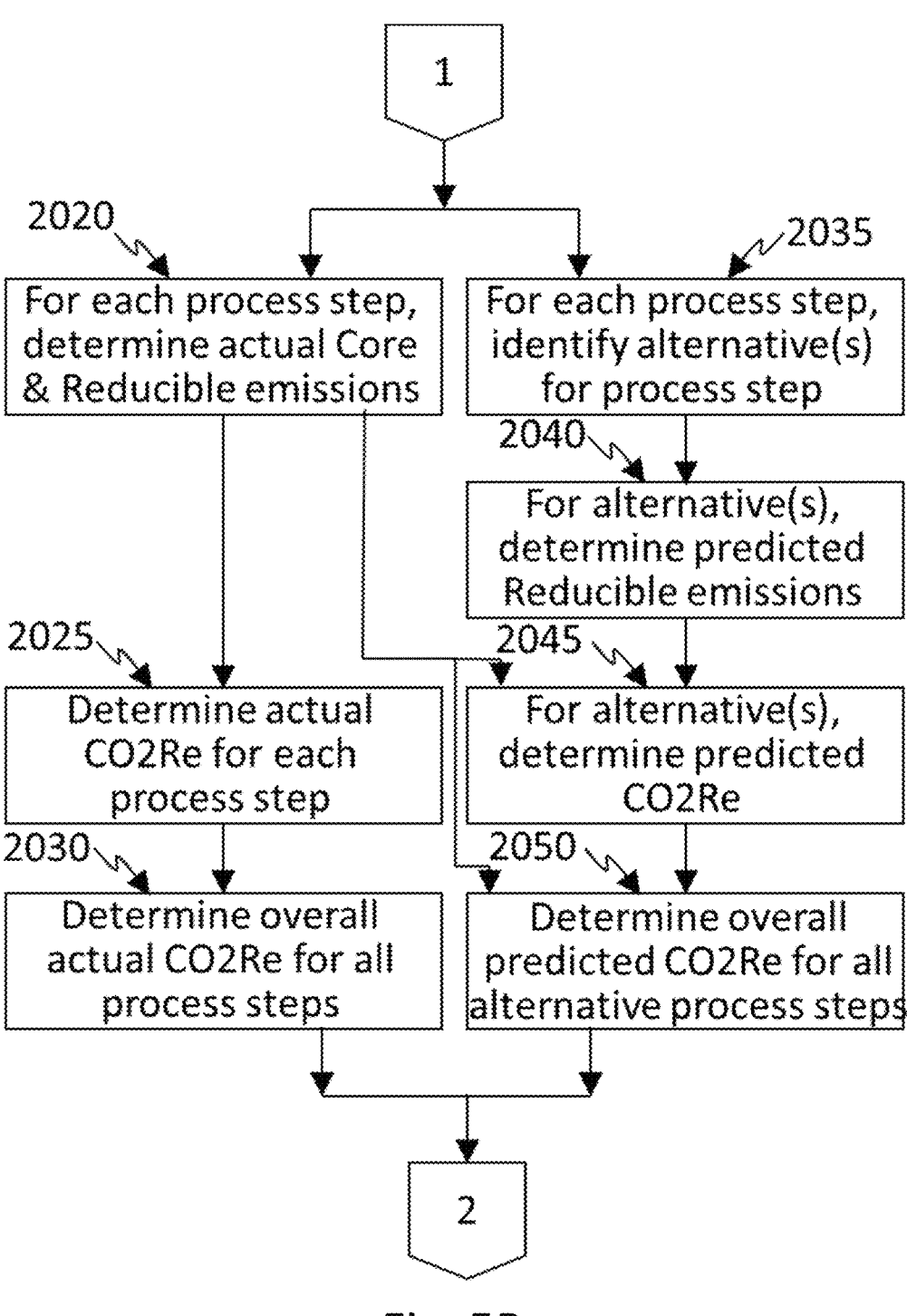

FIG. 5A-B schematically illustrates an embodiment of a block diagram comprising the main steps involved in calculating a $CO_2Re$ value.

As shown in FIG. 5A, in an initial step, the goods or services of interest are selected (2005). Then the process steps needed to generate the goods or services are identified (2010) and the process steps of interest for the $CO_2Re$ value are selected (2015). Note that, at this point, anything from a single process step to a set of process steps to the entirety of process steps needed to generate the goods or services can be selected. A non-limiting example of a single process step could be the process of getting cacao beans from the farms to the port, while a non-limiting example of a set of process steps could be the steps starting with picking the cacao beans and ending with packaging the cocoa and a non-limiting example of the entirety of generating the goods or services could be everything from planting the cacao bushes to disposing of the empty packaging.

As shown in FIG. 5B, next, for each of the selected process steps, the measured Core emissions and Reducible emissions over a predetermined time (typically ending at or near the present time) (2055) are determined (2020) and an actual $CO_2Re$ value is generated (2025). From the Core and Reducible emissions for each step, a total $CO_2Re$ value can be determined (2030), giving the overall $CO_2Re$ value for the selected process steps.

Note that a $CO_2Re$ value can be determined for any desired period of time for which measured emissions are available.

Optionally, the embodiment also provides a means of suggesting improvements to the $CO_2Re$ value by enabling determination of $CO_2Re$ values for at least one alternative for at least one process step. Manually, semi-manually or automatically, for at least one process step, the alternative process step(s) are selected (2035) and, for each selected alternative, predicted Reducible emissions are calculated (2040) and, using the actual Core emissions for the step (2020), the predicted Reducible emissions (2040) and the actual Reducible emissions for all other process steps, total predicted Reducible emissions and a predicted alternative $CO_2Re$ value can be calculated (2045) for the alternative process(es).

From the Core emissions and the predicted Reducible emissions for each step and using actual Reducible emissions for process steps where no alternative has been selected, a total predicted $CO_2Re$ value can be determined (2050), giving the overall predicted $CO_2Re$ value for the selected process steps where the alternative process steps have replaced the actual process steps. From this, the efficacy of replacing existing process steps with alternatives can be clearly seen.

Selection of alternative process steps and calculation of a predicted alternative $CO_2Re$ value can occur at any time. Non-limiting examples comprise: before the first total $CO_2Re$ value is calculated, at the same time as the calculation of the total $CO_2Re$ value, during calculation of the total $CO_2Re$ value and after completion of calculation of the total $CO_2Re$ value.

After the actual $CO_2Re$ value has been calculated and stored, the program is paused (or stopped) for a predetermined time (2055), while Core and Reducible emissions are collected for each process step. After the expiry of the predetermined time the program restarts by determining the actual current Core and Reducible emissions (2020). The program can be restarted at any time to calculate a predicted $CO_2Re$ value (2035) which can then be compared to one or more of the total $CO_2Re$ values. Other ratios can also be generated and compared for both the actual emissions data and the predicted emissions data.

Core and reducible emission data can be collected manually, semi-automatically or automatically.

The flowchart is shown in more detail in FIGS. 6-10. The process starts (FIG. 6) with the selection of the goods and/or services whose $CO_2Re$ value is to be determined (3005). The transformative process(es) needed to generate the goods and/or services from the initial inputs are determined and provided to the package (3010), manually, semi-automatically or automatically. For non-limiting example, in some embodiments, the package will comprise a database of transformative processes from which the desired processes can be selected. The steps in the transformative processes (process steps) are then itemized (3015) and the process step(s) to be analyzed are selected (3020).

Figure 8:
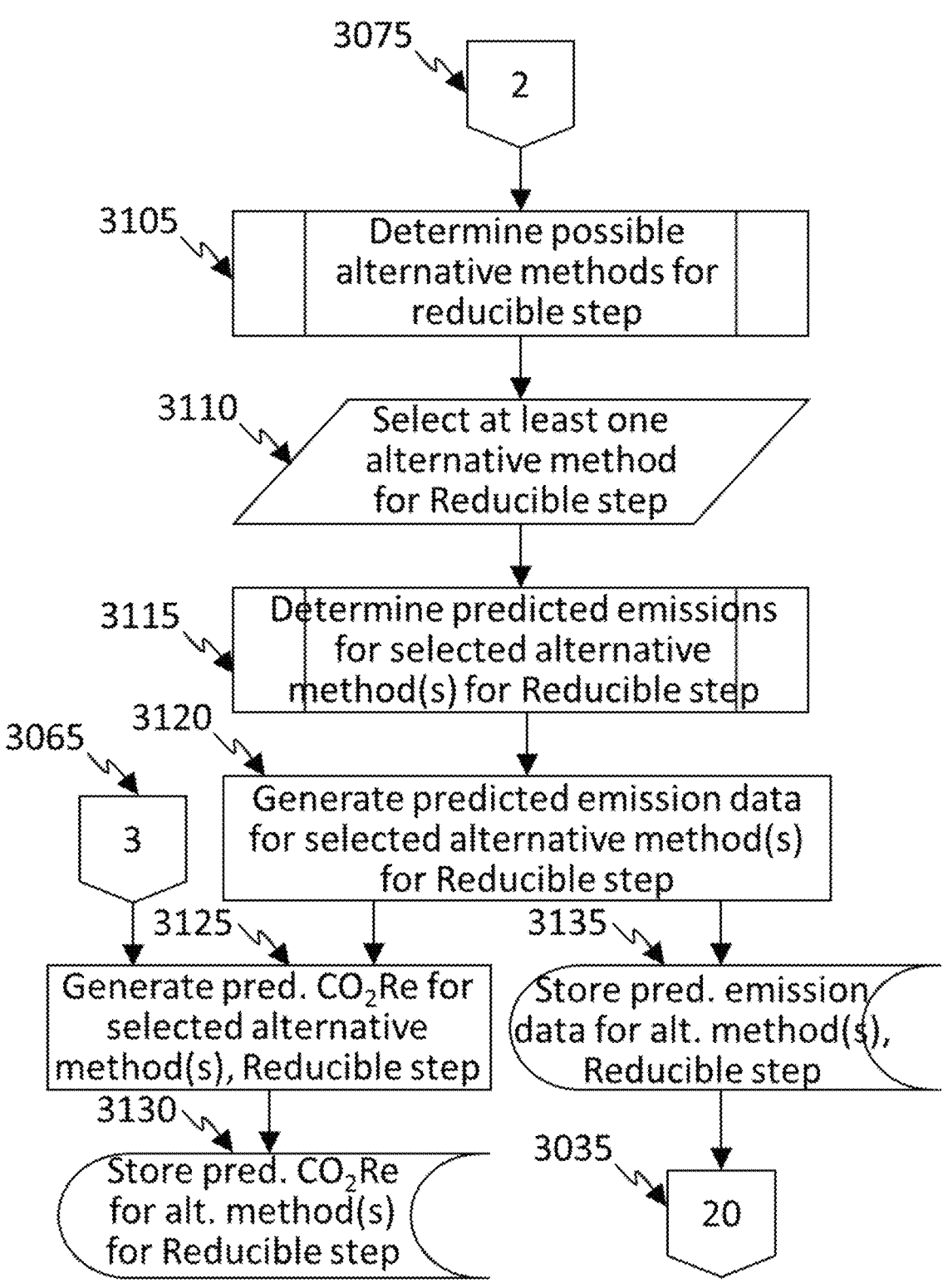
Figure 9:
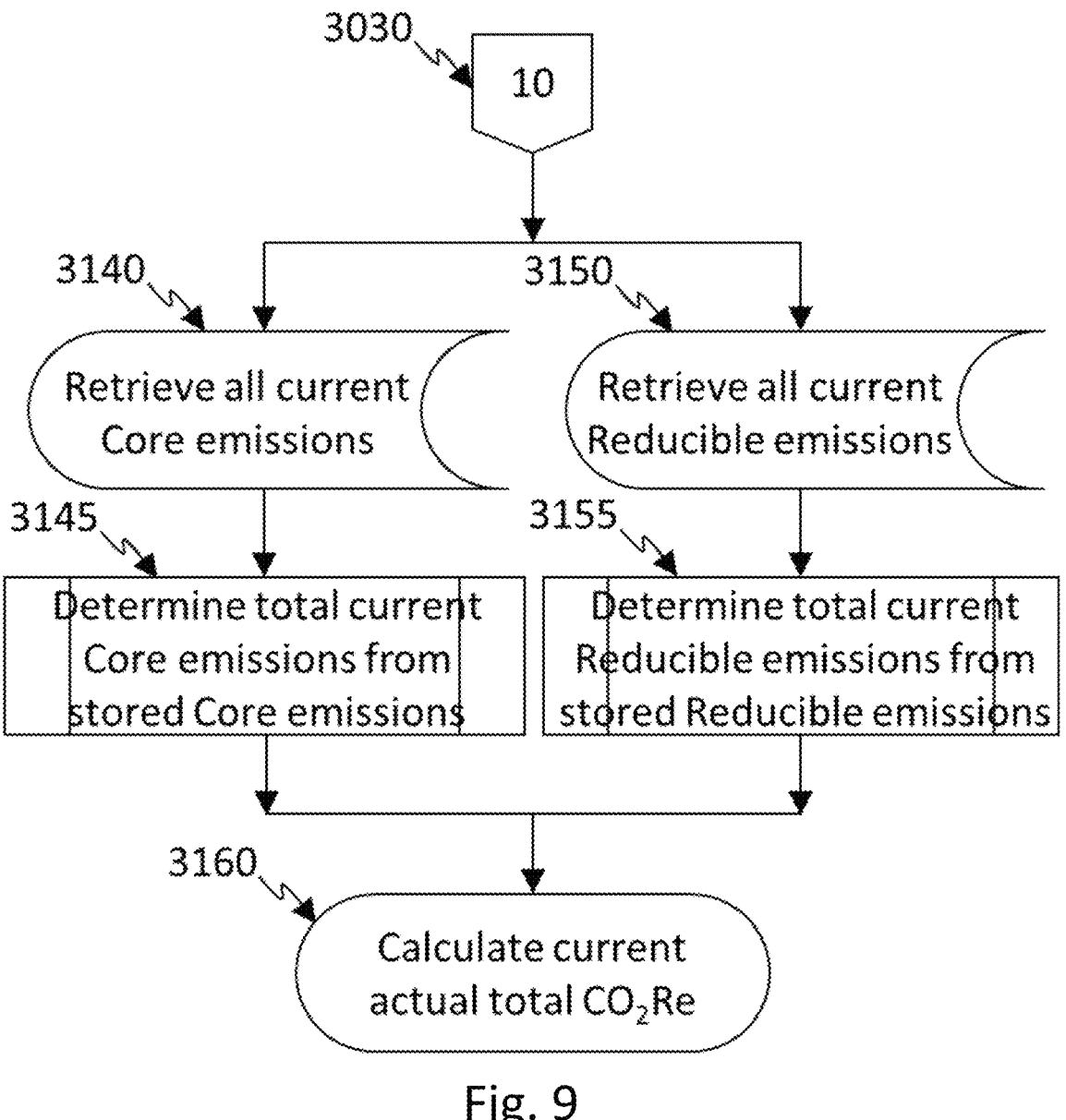
Figure 10:
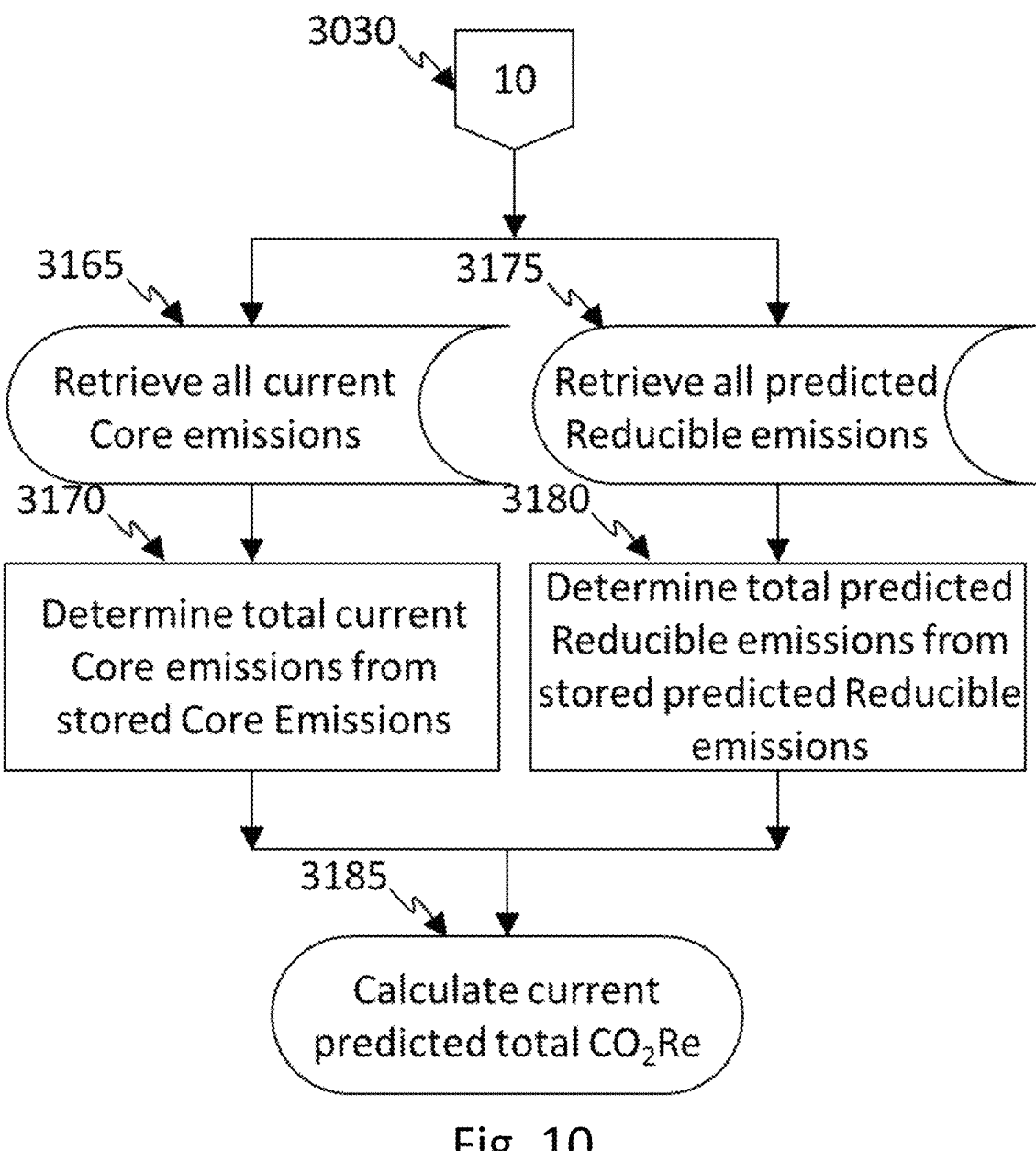

The package then queries (3025) whether all the selected process steps have been analyzed. If any process steps have not yet been analyzed, a next process step is selected (3040) for analysis. If all selected process steps have been analyzed, final calculations will be performed (connection point 10, 3030), as shown in FIGS. 9 and 10, below. If the process step to be analyzed is not the first process step, the package will be returning (connection point 20, 3035) after having completed the analyses for the previous step (FIGS. 7 and 8, below).

Figure 7:
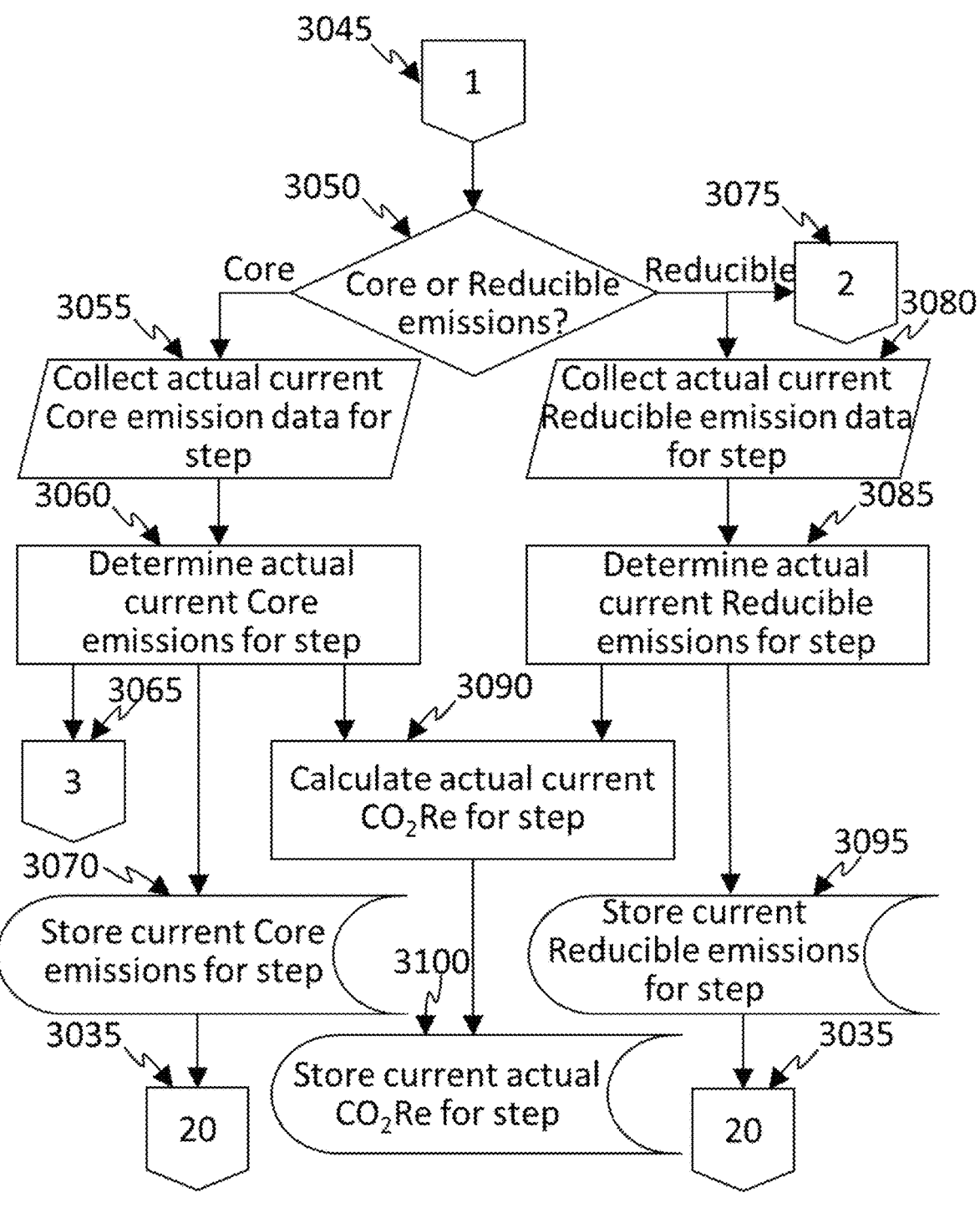

The processing continues in FIG. 7 (connection point 1, 3045). The analysis starts by separating (3050) the emissions generated in the process step into Core emissions and Reducible emissions. The separation can be done manually, semi-automatically or automatically.

For Core emissions, the actual current Core emission data are collected (3055) for the process step (amount of Core emissions) and the actual current Core emissions are determined (3060) from the actual current Core emission data. The current Core emissions are stored, for future use (3070).

For Reducible emissions, the actual current Reducible emission data are collected (3080) for the process step (amount of Reducible emissions) and the actual current Reducible emissions are determined (3085) from the actual current Reducible emission data. The current Reducible emissions are stored, for future use (3095).

Core and Reducible emission data can be collected manually, semi-automatically or automatically.

The actual current Core emission data and the actual current Reducible emission data are the measured emissions over a predetermined time period. Typically, the predetermined time period will end at or near the present time (the time the software is being run), but this need not be the case. The time period can be anywhere from a few minutes to years although, typically, it will be in a range from about a week to about a year.

From the actual current Core emissions for the step and the actual current Reducible emissions for the step, an actual current $CO_2Re$ value for the step is determined (3090) and stored (3100).

Figure 6:
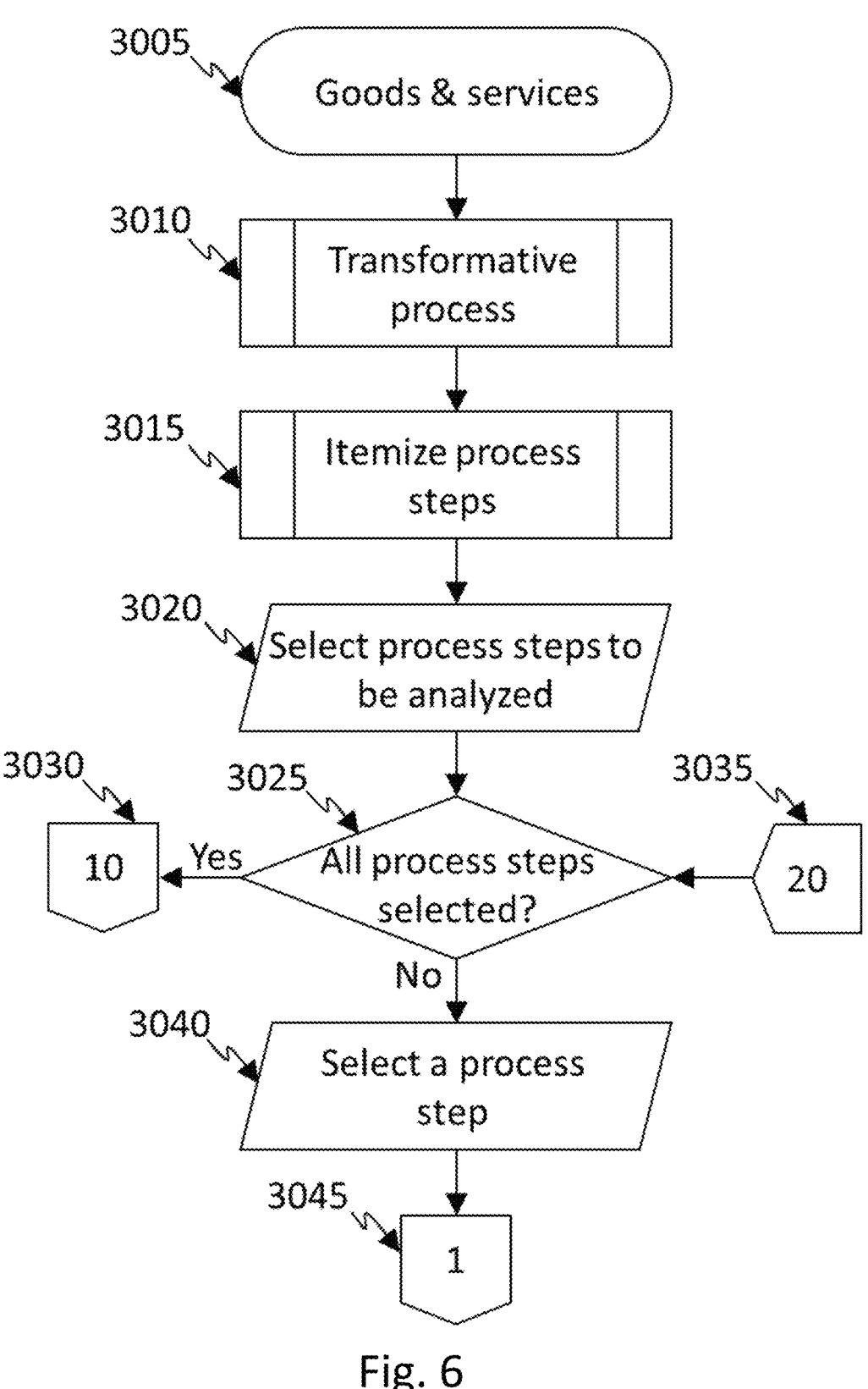
FIGS. 6-10 show an illustrative example of an embodiment of a flowchart to generate CO2Re values.

When the calculations are completed, the processing returns (connection point 20, 3035) to analyze a next process step (3025, FIG. 6).

In addition, for the Reducible emissions, predicted emissions and a predicted CO2Re value can be found for alternative methods of carrying out the step (connection point 2, 3075).

To generate predicted values (connection point 2, 3075), possible alternative methods for carrying out the Reducible activity (3105) are identified and are entered, manually, semi-automatically, or automatically. If such alternative methods for carrying out the Reducible activity exist, one or more is selected (3110) and the predicted emissions are determined (3115) for the selected alternative method(s). Predicted emission data can then be generated (3120) and stored (3135) for the alternative method(s), using the known properties of the alternative method(s) and the known amounts of $CO_2$ emitted for the alternative method(s). For non-limiting example, if the alternative method is an electric vehicle, the known amount of $CO_2$ emitted per mile for the electric vehicle is multiplied by the number of miles traveled to generate the predicted CO2e for the electric vehicle.

Using the actual Core emissions for the step, and a predicted $CO_2Re$ value can be generated (3125) and stored (3130) for the step.

When the calculations are completed, the processing returns (connection point 20, 3035) to analyze a next process step (connection point 20, 3035, FIG. 6).

Once all the steps have been analyzed, the final calculations are performed as shown in FIGS. 9 and 10.

FIG. 9 shows calculation of current actual total $CO_2Re$. After analysis of all the steps (connection point 20, 3035) all of the per-step current Core emissions are retrieved from storage (3140) and the total current Core emissions (total Core emissions) are determined (3145) from the per-step Core emissions. Similarly, all of the per-step current Reducible emissions are retrieved from storage (3150) and the total current Reducible emissions (total Reducible emissions) are determined (3155) from the per-step Reducible emissions. From the total current Core emissions (total Core emissions) and the total current Reducible emissions (total Reducible emissions), a current actual total $CO_2Re$ is determined (3160).

FIG. 10 shows calculation of predicted total $CO_2Re$. After analysis of all the steps (connection point 20, 3035) all of the per-step current Core emissions are retrieved from storage (3165) and the total current Core emissions are determined (3170) from the per-step Core emissions. Similarly, all of the per-step predicted Reducible emissions are retrieved from storage (3175) and the total predicted Reducible emissions are determined (3180) from the per-step predicted Reducible emissions for all steps with per-step predicted Reducible emissions and the per-step actual Reducible emissions for all steps without per-step predicted Reducible emissions. From these, a predicted total $CO_2Re$ is determined (3185).

Example 1—Estimation and Reduction of PCF (Product Carbon Footprint) for Cacao Processing for Chocolate Manufacturing Most cacao is grown in 50 tropical countries by some 2.5 million small scale producers with 5 hectares (12 acres) of land or less.

It takes up to 5 years before a tree produces cacao pods, achieving high yielding pods until the age of 25-30 years.

Once the cacao pods are removed from the trees, the pods are opened and the fruits removed from the pods. The fruits are then fermented to remove most of the pulp and the seeds (and remaining pulp) are dried. Drying is usually done in the sun; in tarps, in patios or in boxes, but mechanical drying, in ovens or solar heaters, can also be used. In some areas, such as the temperate highlands of Brazil or the rainforest areas of Southeast Asia, mechanical (artificial) drying is necessary. In other areas, mechanical driers can shorten the drying process, additionally providing a more controllable process.

A crucial distinction occurs at the drying stage: Slow drying at low temperatures yields cacao pods with high-quality cacao beans that retain a high proportion of valuable nutrients. However, at high temperatures, cacao becomes cocoa, the raw material for chocolate. Hence, high temperature drying is usually required for cocoa and further chocolate manufacturing.

After drying and possibly aging, the dried cacao is sent to a manufacturing plant for cleaning and removal of debris.

The cacao is then roasted. Roasting of the cacao takes place in the manufacturing plant. After roasting, the cacao is winnowed, the outer shells of the seeds are removed from around the beans, leaving only the roasted nibs, which are the key ingredient for chocolate manufacturing.

The cocoa nibs are ground into a paste called chocolate liquor. The liquor is then mechanically pressed to extract cocoa butter, leaving a solid mass called cocoa pressed cake. Cocoa butter is the raw material for chocolate bars and beauty products, while cocoa pressed cake is milled into cocoa powder, which is mainly used for baking products and hot chocolate.

Quality Control

Quality control is carried out at most stages of the process. During harvesting, careful choice is made of the pods to be removed from the trees, as over- or under-ripe pods produce poor chocolate products and, therefore, waste. Selection of properly-ripe fruit is again carried out before fermentation, and fungus-infected fruit is removed and destroyed at this point. During drying, typically, the beans are "turned"-rotated and moved to other parts of the drying surface-so they dry evenly. After drying, during aging (if done) and during storage before transportation to the manufacturing plant, the humidity must be kept low (below 8%) to prevent mold from growing on the beans. During storage, in addition, oxygen must be kept from the beans to prevent deterioration.

Beans are checked for quality on arrival at the manufacturing plants and are checked again after roasting. Quality checks are also carried out on the cocoa liquor, the cocoa butter, the pressed cake and the cocoa powder. There will, of course, be checks on the finished products, typically immediately after manufacture, upon arrival at the warehouse(s) where they are stored prior to sale to a consumer, and upon arrival at the end sales location.

Packing and Transportation

After drying, the cacao can be packed into bags for aging and, after aging, is typically packed into bags for storage. Typically, the cacao is shipped from producer to manufacturing plant in bags; these can be the same bags as used for storage or other bags. A wide variety of packing materials can be used for intermediate products such as cocoa liquor, cocoa butter and pressed cake, and an even wider variety of packaging materials can be used for the finished products, from cocoa powder to chocolate coated ice cream cones.

Reductions in production of $CO_2$ can be made during all stages of production, from growing to quality control, and also in the stages of packaging and transportation of the finished products.

Growing, Harvesting and Fermenting

Most of the work involved in these three initial stages is through artisanal small-scale labor in small production units. Since hard physical labor is used instead of machinery, there is little scope for reducing $CO_2$ emissions.

DRYING—Again, most of the work is through artisanal small-scale labor in small production units. Emissions can be reduced by replacing electrically powered or fossil-fuel powered drying ovens with solar-powered drying ovens, or by replacing the ovens with more efficient machinery or by upgrading the ovens. For non-limiting example, insulation could be improved so that the oven generates less waste heat.

ROASTING—Powered roasting ovens are used. Emissions can be reduced by replacing electrically powered or fossil-fuel powered roasting ovens with solar-powered roasting ovens, or by replacing the ovens with more efficient machinery or by upgrading the ovens. For non-limiting example, insulation could be improved so that the oven generates less waste heat.

WINNOWING—Powered winnowers are used. Emissions can be reduced by replacing electrically powered or fossil-fuel powered winnowers with solar-powered winnowers.

GRINDING, PRESSING AND MILLING—Powered grinders, pressing machines and milling machines are used. Emissions can be reduced by replacing electrically powered or fossil-fuel powered grinders, pressing machines and milling machines with solar-powered grinders, pressing machines and milling machines. This may be difficult in countries such as the UK or the Netherlands, which are often cloudy and where the sun is at a low angle for most of the year. It is also possible to replace existing equipment with more efficient equipment.

As discussed above, many of the relatively easy reductions in a company's GHG emissions are found in its Scope 3 emissions, both in upstream and downstream cycles. Consequently, the obvious first attempts at reducing CO2e would be directed to the easier changes such as the two methods mentioned above, reduction in energy use and, although often less important, transition, where possible, to electric transportation.

Returning to the cocoa example above, as the company continues to attempt to reduce its carbon footprint by transitioning to greener technologies, it may decide to do one or more of the following: source from cacao producers and cocoa producers who are mindful of methods of land-use that minimize damage to the environment, and change from cocoa producers with land use or land use changes that can damage the environment to cocoa producers who are more careful to avoid damaging the environment.

In general, if the manufacturer is not the producer of the raw material, as is often the case, then it may change the requirements it applies to the sources of its raw materials, in order to lower the carbon footprint at the source of the raw materials, such as, but not limited to, sourcing, growing, breeding and mining. For non-limiting example, a manufacturer can help farmers apply methods of planting that reduce degradation of the local ecosystems. As has been mentioned previously, land-use changes are one of the largest sources of CO2e emissions globally. The ensuing reductions in CO2e would then reflect a lower Reducible number in the next PCF assessment.

Another potential area where reductions can be achieved is the packaging of products. In many cases, packaging constitutes a disproportionate source of emissions. Hence, finding alternate materials for packaging, reducing the amount of packaging, and reuse and recycling of packaging can lower the Reducible value by a significant amount.

It should be noted that the C (Core) value usually stays intact as the R (Reducible) value changes because the C value reflects current technology that does not allow a scalable and economically viable reduction of the carbon footprint to occur for some processes and activities. However, the C value is not immutable; it can change when technological changes occur. So while the C value is an acknowledgement that there exist technological and economic limitations, it also implies that when technologies and economic limitations change, the Core value can also change.

It should be noted that other ratios that can be determined which can be useful under some circumstances and can, under some circumstances, more clearly illustrate progress or lack thereof than the $CO_2Re$ formula disclosed above. One such ratio, the Core/Total Ratio $C_T$, illustrates how sustainable a good or service is, as it emphasizes the scale of Core (unavoidable) emissions as compared to the Total emissions, where the Total emissions are the sum of the Core emissions and the Reducible emissions. The Core/Total Ratio is $$C_T = \text{Core/Total} = C/T$$

Another ratio, which also illustrates sustainability, is the Core/Reducible Ratio $C_R$, which emphasizes the scale of Core (unavoidable) emissions as compared to the Reducible (avoidable) emissions. The Core/Reducible Ratio is $$C_R = \text{Core/Reducible} = C/R \qquad 5$$

Changes are easier to see with $C_R$ than with $CO_2Re$ if R is small compared to C.

Yet another ratio is the Reducible/Total ratio $R_T$, the ratio of the Reducible emissions to the total emissions.

The Reducible/Total Ratio is $$R_T = \text{Reducible/Total} = R/T \qquad 15$$

$R_T$ shows how avoidable emissions of the good or service are, as it emphasizes the scale of the Reducible (avoidable) emissions as compared to the Total emissions. Viewed through this angle, a quick overview of how much of the product's emissions can be reduced is available in a simple manner, reflecting also on the amount of available changes that are inherently present in the life cycle of a good or service.

All of the ratios disclosed above, $CO_2Re$, $C_T$, $C_R$ and $R_T$, can be applied both to a Product Carbon Footprint and to a Corporate Carbon Footprint.

It should be noted that $C_T$ tends to 1 as the Reducible diminishes; if all Reducible emissions are eliminated, the only remaining emissions are Core emissions, so the Total emissions equal the Core emissions. $CO_2Re=R/C$, on the other hand, tends to zero under the same circumstances.

Rating Scale

The ratio $CO_2Re=R/C$ reflects a commitment to environmentally sustainable activities, both as a yardstick of an individual CO2e footprint as well as an overall ecological footprint. It can show progress towards achieving environmental goals, and ultimately, how committed the entity is to transition into green technologies. Most importantly, it emphasizes the Reducible side of the equation by providing the entity a value it can affect and upon which it can have a real effect.

The entity can be, for non-limiting example, an individual or a group of individuals (for non-limiting example, a club or society); a public company; a private company; an institution, public, private or governmental (for non-limiting example, a hospital); or a jurisdiction such as a city, a municipality, a county, a region, a state, a country, or group of countries (for non-limiting example, the European Union, or the Association of Southeast Asian Nations (ASEAN)).

For non-limiting example, if the entity is a company, either public or private, an individual CO2e footprint could be that of a product or group of products, and if the entity is a jurisdiction such as a city, an individual CO2e footprint could be that of the Fire Department or the municipal libraries.

It also provides a way to contextualize the reduction efforts, ascertaining a company's achievements, or lack thereof, in relation to other companies.

Hence, a Rating Scale of Companies' sustainability performance is a logical consequence of attributing a value to their performance in this area.

As there is a growing demand from individual consumers that their purchases be made from companies that are actively working to mitigate their ecological footprints, the monetary value of a company's $CO_2Re$ value will be set by their customers' satisfaction rates with the monetary value measured through variations in the volume of sold goods or services.

Example 2—Theo Kakao

Returning to the cocoa example above, a company, Theo Kakao, has made many changes over the course of a three-year period aimed at reducing their CO2e emissions. These changes can be found in many areas of the Life-Cycle of their products as well as addressing Scope 3 emissions found within the everyday routines throughout their corporate levels. A new PCF assessment finds their R value to be 0.3847 kg CO2e with the C value unchanged at 0.2817 kg CO2e.

$$CO_2Re = 0.3847/0.2817 = 1.36$$

Using this method, the company can see a significant reduction in $CO_2Re$. It should be noted that, even if a company's product mix changes, thereby changing the Core emissions value, a company can still easily keep track of progress towards (or away from) minimizing unnecessary emissions.

Example 3—Supply Chain Emission Reduction Strategies

This example shows the effectiveness of strategies for reduction of emissions for the supply chain for cacao grown in Panama with initial processing at a plant in Panama that is near the port from which the processed cocoa product(s) will be shipped to Europe for further processing.

Sources & Materials

The LCA calculations have been performed with the use of OpenLCA 1.10.2 (OpenLCA.org); and ReCiPe Midpoint 2016 was used to evaluate the environmental impacts and to estimate global warming potential (Huijbregts, et al. 2017; Int J Life Cycle Assess 22, 138-147).

Strategy 1: Modifying Agricultural Production

An LCA analysis of the cocoa supply chain indicates that most emissions occur during agricultural production.

Reducing emissions in agriculture can be achieved through better agricultural practices, which can both reduce emissions and lead to higher yields, by more efficient use of inputs and by employment of better farming practices.

Two exemplary approaches for modifying agricultural production are discussed, the approach of using the existing Certified Cocoa scheme and by direct engagement in the supply chain.

A. Certified Cocoa Scheme

A common way to ensure sustainable farming practices is through certification, such as the Rainforest Alliance or UTZ. Studies of different cacao certification schemes estimate that higher yields, on the order of 21%, are derivable by following a Certified Cocoa scheme. This is in line with estimates of the effects of training farmers in the cacao sector on productivity, which can lead to improvements in yield on the order of 14%-32% (KPMG 2012—*Cocoa Certification: Study costs, advantages and disadvantages of cocoa certification by the ICCO*).

Based on a typical baseline scenario this means a yield increase to 147 kg/ha for the certified cacao, compared to a yield of 121 kg/ha for non-certified cacao and a reduction of 0.98 kg CO2e to 4.60 kg CO2e per kilogram from the 5.58 kg CO2e for non-certified cacao.

A further advantage to a grower of cocoa (although a disadvantage to a producer of chocolate) of switching to certified cocoa is that it comes with an average price premium of 100$/ton.

Thus there is a reduction of 9.8 kg CO2e per dollar spent. As certified cacao is traded freely, companies may set their own targets on when all sourced cocoa must be certified. Today, the industry average is 45% certified cacao.

B. Direct Engagement in the Supply Chain

Direct engagement of chocolate producers with cacao growers is increasingly common (e.g. Nestle Better Cocoa (Nestle 2019—*Cocoa Plan Progress Report*), Ritter Sport Unser Kakao (Ritter Sport 2020—*Sustainability Report*)). These programs aim to ensure traceability but, more importantly, to provide training and to promote sustainable farming practices. Some programs also distribute shade trees, leading to yield increases and improvement in overall sustainability. Usually, this is done in combination with external certification bodies. These programs are typically more time and resource-intensive than use of the Certified Cocoa scheme but the benefits can exceed traditional certification.

Compared to the same baseline scenario, yield increases of up to 25%, for a yield of 151 kg/ha, are possible. Simultaneously, improved agricultural practices result in more efficient use of inputs. Overall this leads to a reduction of 1.78 kg CO2e to 3.8 kg CO2e per kg of cacao. These reductions reduce the total emissions of the overall supply chain by up to 29%.

Industry data indicate that medium-sized cocoa processing company, a global player, will typically invest between 10 million and 27 million dollars per year in direct engagement projects. While it is possible to source all cacao through these projects, 60% of total cacao requirements is more realistic, leading to a reduction of 2.28 kg CO2e per dollar spent.

It should be noted that, using either a Certified Cocoa scheme or direct engagement, in this scenario, 3.8 kg CO2e per kg of cacao are Core emissions that cannot be reduced further and need to be compensated for.

Reduction Strategy 2: Transportation

Emission reduction by reducing emissions from transportation is a well-known strategy and one that is very tangible. However, for cocoa processing, total emissions from transportation are low compared to emissions associated with cultivation or processing.

Replacing old trucks in a fleet with state-of-the-art trucks can potentially lower emissions by 0.02 kg CO2e. per kg of coca transported compared to the baseline scenario (EcoTransit World Initiative 2019—*Ecological Transport Information Tool for Worldwide Transports*). If trucks are replaced only when they are fully depreciated, complete replacement of the old trucks could be achieved within 10 years.

A less expensive and more effective pathway is to shift from road to rail transport where possible (e.g. Europe) (Allianz Pro Schiene 2020—*Umwelt Daten & Fakten*). Shifting to rail transport, without any other changes, can reduce emissions by 0.023 kg CO2e per kg of cocoa transported.

A combination of both replacing trucks and switching to rail yields a reduction of 0.038 kg CO2e, or a reduction of 0.5% of total emissions in the supply chain.

It should be noted that, under these conditions, 0.1174 kg CO2e are Core emissions that cannot be reduced further and must be compensated for.

An additional method of reducing emissions is to improve transport routes and to otherwise work with logistics providers to ensure that transport is carried out as efficiently as is practicable. It is difficult to quantify the effects of improving routing and increasing transport efficiency, as these are heavily dependent on the individual circumstances of the cacao grower, the chocolate producer and the transport means between them. For non-limiting example, provision of a new road between a cacao plantation and a shipping port can significantly reduce CO2e production during transport, by providing a shorter route between the plantation and a warehouse at the port, by reducing congestion on one or more roads, by reducing the number of hills to be traversed, by reducing the grade of one or more hills traversed or by bypassing one or more hills, and any combination thereof.

From a financial and organizational perspective, replacing the whole fleet of trucks can be of questionable merit. The focus should rather be on improving transport routes and working with logistic providers that offer carbon offsetting.

Reduction Strategy 3: Renewable Energy Supply

Using renewable energy sources in the processing phase can lead to a substantial reduction of emissions (Rothoff, Alexander 2018—*Evaluating a Power Supply System for a Small-Scale Cocoa Processing Plant*). Additionally, improving process efficiency is crucial for large-scale plants (Asselstine, Mollo et al. 2016—*Cocoa Liquor, Butter & Powder Production*).

Small-scale processing plants in producing countries can use a mix of solar and biobased energy to power their operations. Solar energy reduces emissions from 0.14 kg CO2e to a net zero. Relying on biobased fuels instead of fossil fuels to heat air and water can lower emissions by 0.30 kg by 1.08 per kg of cocoa butter produced. This equals a total reduction of 95% for the process and a reduction of 5.9% for the whole supply chain.

As of today, renewable and conventional fuel sources are comparably priced. The timeline is flexible, but a complete switch can be achieved within 2 years. If electricity is to be generated at the plant itself, the effects are felt immediately, but an investment of at least 40,000 US$ is required.

If cocoa is being processed in large-scale facilities in Europe, higher reductions can be achieved through an energy-efficient design of facilities, such as trigeneration. In this case, emissions can be reduced by 0.19 kg CO2e per kg of cocoa liquor. Another advantage is that other cocoa products, like cocoa butter and cocoa power, are produced at the same location and therefore share in the CO2e reduction.

Figure 11:
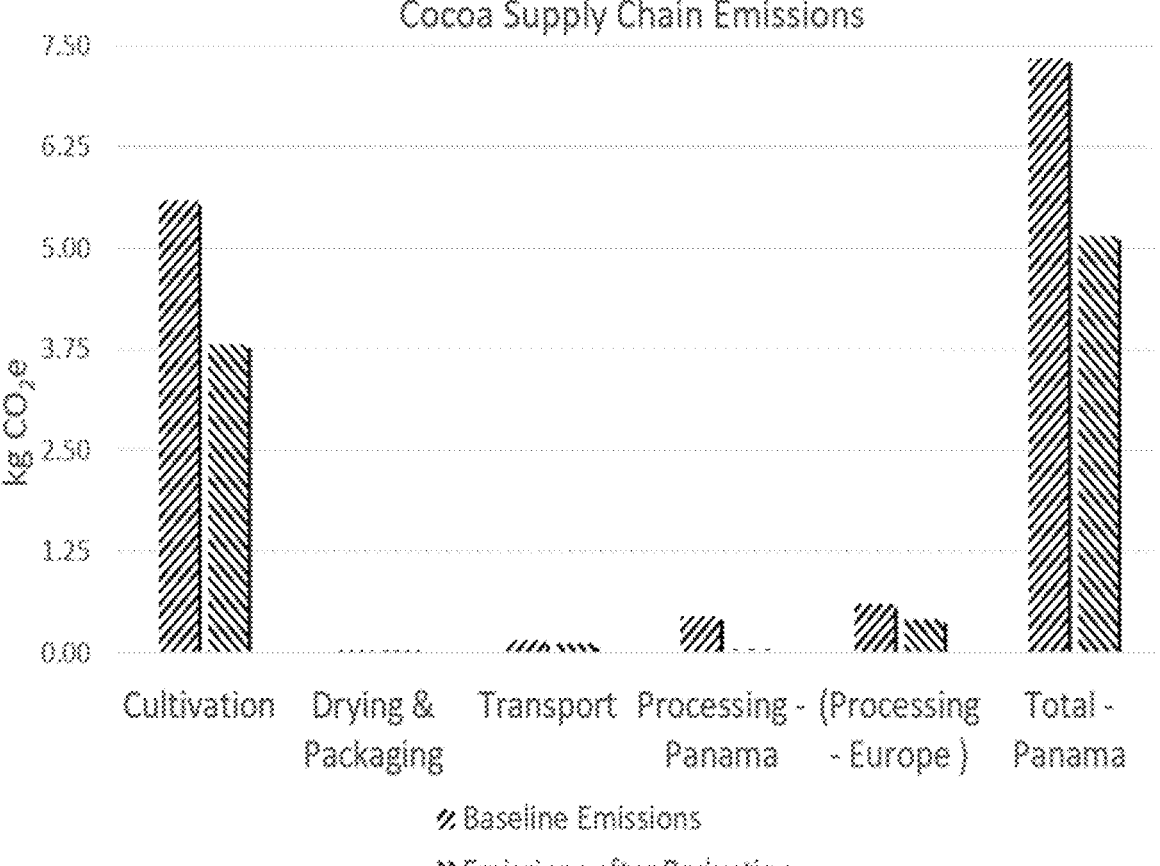
FIG. 11 illustrates exemplary reduction in $CO_2$ emissions for cocoa processing.

Table II shows process emissions per kg of cocoa liquor at different stages along the supply chain, before and after implementation of reduction measures, with the process emissions graphically illustrated in FIG. 11. It should be noted that, in FIG. 11, the emissions after reduction for production in Panama are difficult to see. This is because it should be possible, in Panama, to reduce the emissions, after 5 years, by 94% (from 0.46 kg CO2e per kg of cocoa to 0.02 kg CO2e per kg of cocoa.)

TABLE II

| Process Step | Reduction Potential [kg CO2e/kg product] | Effect on Supply Chain [relative to baseline] | Cost [$/ton of product] | Timeline |
|---|---|---|---|---|
| Cultivation Certified Cocoa | 0.98 | −16% | 100 $/ton | Short Term 1-5 years |
| Cultivation Direct Partnerships | 1.78 | −29.0% | 250$/ton | Long term 10+ years |
| Transportation | 0.038 | −0.5% | 0-40 $/ton | Short term <2 years |
| Processing I Renewable Energy Supply | 0.3 | −5.9% | 0-15 $/ton | Short term <2 years |
| Processing II Increased Process Efficiency | 0.2 | −2.6% | 0-5 $/ton | Medium-term <5 years |

Example 4—CO2e Reduction During Cultivation of Cacao

As described above, in the production of cocoa, the most CO2e-intensive step is cultivation. The following shows use of the $CO_2Re$ package of the present invention for the cultivation stage, producing the cacao beans.

For cocoa production in Panama, the Reducible CO2e emissions were 1.78 kg of CO2e per kg of the finished product, namely cocoa. The Core CO2e emissions were 3.81 kg of CO2e per kg of cocoa, so that the total was 5.59 kg of CO2e per kg of cocoa.

A plan is put in place to reduce, over six years, the total emissions by 1.08 kg of CO2e per kg of cocoa to 4.51 kg of CO2e per kg of cocoa. The plan comprises a combination of (1) minimizing the number of truck trips for delivering the cacao to the port by ensuring that each truck trip comprises a full load; (2) replacing trucks due for replacement with more fuel-efficient vehicles; (3) increasing the use of bio-fuels during production of cocoa nibs from cocoa beans and (4) increasing use of solar power during the drying process.

Under this scenario, the Reducible emissions will go down to 0.7 kg of CO2e per kg of cocoa at year 6 (1.78-1.08). Therefore, the $CO_2Re$ ratio will be reduced from 0.467 to 0.184, showing that significant progress has been made, but that further reductions can be made. The $CO_2Re$ ratio also provides a clear indication of how effectively the plan is being followed. In some embodiments, a plurality of ratios can be provided by breaking the cultivation step into sub-steps, which can indicate what are the most problematic parts of the cultivation process. Along with knowledge of the sizes of the various parts of the process, this can indicate where effort is most effectively placed to reduce the overall production of CO2e.

Clearly, the methodology can be applied to all areas and all stages of the supply chain and to all stages in the product life cycle, providing, in a clear and immediate snapshot, a precise picture of the amounts of CO2e produced and, more importantly, the amounts that can and cannot be reduced, thus providing very useful information for the manufacturer as well as the end-consumer and other stakeholders.

The invention claimed is:
1. A method for determining a measure of reducibility of greenhouse gases comprising steps of:
identifying a set of activities, said identifying of said set of activities being selected from a group consisting of automatically, semi-automatically or manually;

for said set of activities, identifying a first subset of activities, each member of said first subset generating Reducible emissions, said identifying of said first subset of activities being selected from a group consisting of automatically, semi-automatically or manually;
for said set of activities, identifying a second subset of activities, each member of said second subset generating Core emissions, said identifying of said second subset of activities being selected from a group consisting of automatically, semi-automatically or manually;
providing an emission ratio for a predetermined period of time, comprising steps of:
for each member of said first subset of activities, determining an amount of Reducible emissions, said determining of said amount of Reducible emissions selected from a group consisting of automatically, semi-automatically or manually;
generating total Reducible emissions from said subset of Reducible emissions;
for each member of said second subset of activities, determining an amount of Core emissions, said determining of said amount of Core emissions being selected from a group consisting of automatically, semi-automatically or manually;
generating total Core emissions from said subset of Core emissions;
generating total emissions from said total Core emissions and said total Reducible emissions;
generating said emission ratio as a ratio of said total Reducible emissions to said total Core emissions; and
storing said total Core emissions and said total Reducible emissions; and
repeating said providing an emission ratio at least once, over a different predetermined period of time;
thereby tracking said emission ratio to provide an effective measure of said reducibility of said greenhouse gases for said set of activities, wherein said emission ratio quantifies the inherent potential for further reduction of said greenhouse gases.
2. The method of claim 1, additionally comprising a step of identifying at least one alternative activity, at least one result of said alternative activity being equivalent to at least one result of at least one member of said set of activities.
3. The method of claim 2, additionally comprising a step of generating a predicted amount of Reducible emissions for said at least one alternative activity.

4. The method of claim 3, additionally comprising a step of generating total predicted Reducible emissions from said predicted Reducible emissions and Reducible emissions for activities in said subset of Reducible emissions where there are no predicted Reducible emissions.

5. The method of claim 4, additionally comprising the following steps:

generating total predicted emissions from said total predicted Reducible emissions and said total Core emissions; and generating a predicted emission ratio as a ratio of said total predicted Reducible emissions to said total Core emissions.

6. The method of claim 1, additionally comprising a step of selecting said Reducible emissions from a group consisting of carbon dioxide ($CO_2$) emissions, methane ($CH_4$) emissions, ozone ($O_3$) emissions, nitrous oxide ($N_2O$) emissions, chlorofluorocarbon emissions, hydrofluorocarbon emissions or any combination thereof.

7. The method of claim 1, additionally comprising a step of selecting said Core emissions from a group consisting of carbon dioxide ($CO_2$) emissions, methane ($CH_4$) emissions, ozone ($O_3$) emissions, nitrous oxide ($N_2O$) emissions, chlorofluorocarbon emissions, hydrofluorocarbon emissions or any combination thereof.

8. A system for determining a measure of reducibility of greenhouse gases, comprising:

one or more processors; and a computer-readable storage device coupled to the one or more processors and having instructions stored thereon which, when executed by the one or more processors, cause the one or more processors to perform operations comprising:

identifying a set of activities, said identifying of said set of activities being selected from a group consisting of automatically, semi-automatically or manually;

for said set of activities, identifying a first subset of activities, each member of said first subset generating Reducible emissions, said identifying of said first subset of activities selected from a group consisting of automatically, semi-automatically or manually;

for said set of activities, identifying a second subset of activities, each member of said second subset generating Core emissions, said identifying of said second subset of activities selected from a group consisting of automatically, semi-automatically or manually;

providing an emission ratio for a predetermined period of time, comprising steps of:

for each member of said first subset of activities, determining an amount of Reducible emissions, said determining of said amount of Reducible emissions selected from a group consisting of automatically, semi-automatically or manually;

generating total Reducible emissions from said subset of Reducible emissions;

for each member of said second subset of activities, determining an amount of Core emissions, said determining of said amount of Core emissions selected from a group consisting of automatically, semi-automatically or manually;

generating total Core emissions from said subset of Core emissions;

generating total emissions from said total Core emissions and said total Reducible emissions;

generating said emission ratio as a ratio of said total Reducible emissions to said total Core emissions; and storing said total Core emissions and said total emissions; and repeating said providing an emission ratio at least once, over a different predetermined period of time;

wherein said emission ratio is trackable, said trackability providing an effective measure of said reducibility of said greenhouse gases for said set of activities, further wherein said emission ratio quantifies the inherent potential for further reduction of said greenhouse gases.

9. The system of claim 8, wherein at least one alternative activity is identified as having at least one result of said alternative activity being equivalent to at least one result of at least one member of said set of activities.

10. The system of claim 9, wherein a predicted amount of Reducible emissions is generated for said at least one alternative activity.

11. The system of claim 10, wherein total predicted Reducible emissions are generated from said predicted Reducible emissions and Reducible emissions for activities in said subset of Reducible emissions where there are no predicted Reducible emissions.

12. The system of claim 11, wherein total predicted emissions are generated from said total predicted Reducible emissions and said total Core emissions; and a predicted emission ratio is generated as a ratio of said total predicted Reducible emissions to said total Core emissions.

13. The system of claim 8, wherein said Reducible emissions are selected from a group consisting of carbon dioxide ($CO_2$) emissions, methane ($CH_4$) emissions, ozone ($O_3$) emissions, nitrous oxide ($N_2O$) emissions, chlorofluorocarbon emissions, hydrofluorocarbon emissions or any combination thereof.

14. The system of claim 8, wherein said Core emissions are selected from a group consisting of carbon dioxide ($CO_2$) emissions, methane ($CH_4$) emissions, ozone ($O_3$) emissions, nitrous oxide ($N_2O$) emissions, chlorofluorocarbon emissions, hydrofluorocarbon emissions or any combination thereof.

* * * * *